US008815969B2

(12) United States Patent
Chen

(10) Patent No.: US 8,815,969 B2
(45) Date of Patent: Aug. 26, 2014

(54) PLANT OIL-BASED UV-CURABLE COATING

(75) Inventor: Zhigang Chen, Dublin, OH (US)

(73) Assignee: NDSU Research Foundation, Fargo, ND (US)

( * ) Notice: Subject to any disclaimer, the term of this patent is extended or adjusted under 35 U.S.C. 154(b) by 0 days.

(21) Appl. No.: 13/362,860

(22) Filed: Jan. 31, 2012

(65) Prior Publication Data

US 2012/0202909 A1 Aug. 9, 2012

Related U.S. Application Data

(60) Provisional application No. 61/439,592, filed on Feb. 4, 2011.

(51) Int. Cl.
| | | |
|---|---|---|
| C08F 299/04 | (2006.01) | |
| C08F 20/20 | (2006.01) | |
| C09D 4/02 | (2006.01) | |
| C08K 5/103 | (2006.01) | |
| C08K 5/1515 | (2006.01) | |
| C08K 5/00 | (2006.01) | |

(52) U.S. Cl.
CPC .............. *C08K 5/1515* (2013.01); *C08K 5/103* (2013.01); *C08K 5/0025* (2013.01)
USPC ............. 522/18; 522/104; 522/107; 525/445; 526/238.3; 526/302

(58) Field of Classification Search
USPC ...................... 522/18, 71, 104, 107; 524/753; 525/445; 526/238.3, 320; 106/31.96
See application file for complete search history.

(56) References Cited

U.S. PATENT DOCUMENTS

| 2005/0159501 A1* | 7/2005 | Kiefer-Liptak ................. 522/71 |
| 2008/0090930 A1* | 4/2008 | Madhusoodhanan et al. .. 522/83 |

FOREIGN PATENT DOCUMENTS

| DE | 195 45 870 A1 | 6/1997 |
| WO | WO 2012/094601 A1 | 7/2012 |

OTHER PUBLICATIONS

Anderson, "Continued support awarded in biorenewable coating materials research," Mar. 11, 2010 *NDSU News* Retrieved from the Internet on Jul. 23, 2013. Available online at: <http://www.ndsu.edu/news/view/article/7361/>; 1 page.
Benning et al. "Harnessing plant biomass for biofuels and biomaterials," May 2008 *The Plant J.* 54:533-535. Available online on May 9, 2008.
Biswas et al. "Soybean oil as a renewable feedstock for nitrogen-containing derivatives," Dec. 1, 2008 *Energy Environ. Sci.* 1:639-644. Available online on Sep. 19, 2008.
Chen et al. "Soy-based, high biorenewable content UV curable coatings," May 2011 *Prog. Org. Coatings.* 71:98-109. Available online on Feb. 22, 2011.

Chen, "Development of green UV curable coatings and polymer materials," slides presented with a talk given at the *2010 Radtech China Conference.* Beihai, China: Apr. 12, 2010.
Chen, "Development of 'sweet,' soy-based, high biorenewable content UV curable coatings," slides presented at the *UV&EB 2010 Technology Expo and Conference.* Sponsored by RADTECH (The Associate for UV&EB Technology). Baltimore, MD: May 23-26, 2010.
Chen, "Green soy-based urethane-acrylates (SUAs) for thermoset coatings and composites," Grant Abstract, United Soybean Board 2010, Retrieved from the Internet on Jul. 8, 2013: http://www.soybeancheckoffresearch.org/DetailsbyPaperid.php?id_Paper=967.
Chen, "Development of high performance soy-based UV curable coatings," Grant Abstract, United Soybean Board 2010, Retrieved from the Internet on Jul. 8, 2013: http://www.soybeancheckoffresearch.org/DetailsbyPaperid.php?id_Paper=1110.
Chen, "Development of high performance soy-based curable UV coatings," Grant Abstract, United Soybean Board 2011, Retrieved from the Internet on Jul. 8, 2013: http://www.soybeancheckoffresearch.org/DetailsbyPaperid.php?id_Paper=1827.
Chen, "Green soy-based urethane-acrylates (SUAs) for thermoset coatings and composites," Grant Abstract, United Soybean Board 2011, Retrieved from the Internet on Jul. 8, 2013: http://www.soybeancheckoffresearch.org/DetailsbyPaperid.php?id_Paper=1922.
Ebert, "Furfural: Future Feedstock for Fuels and chemicals," *Biomass Magazine* Sep. 2008; retrieved from the Internet on Jan. 23, 2012. Available online at: <http://www.biomassmagazine.com/articles/1950/furfural-future-feedstock-for-fuels-and-chemicals>; 2 pages.
"Energy Curable Renewable Raw Material," Cytec Industries, Inc.: Smyrna, GA. Copyright 2009; 7 pages.
Froehling, "Development of DSM's Hybrane® hyperbranched polyesteramides," Jul. 1, 2004 *J. Polym. Sci. Part A: Polym. Chem.* 42:3110-3115. Available online on May 18, 2004.
Golden et al. "Low-Emission Technologies: A Path to Greener Industry." May/Jun. 2005 *Radtech Report* pp. 14-18.
Klang et al. "Radiation Curable Hyperbranched Polyester Acrylates," Apr. 11, 2007 *Painting and Coatings Industry* pp. 98-101. Online magazine available at: www.pcimag.com.
Nikolau et al., "Platform biochemicals for a biorenewable chemical industry," May 2008 *The Plant J.* 54:536-545. Available online on May 9, 2008.
Orr. "Paints & Coatings: A Market Opportunity Study Update," Jan. 2009. Prepare by Omni Tech International, Ltd. for the United Soybean Board.
Radtech Technical Committee. "UV/EB Technology, a Way to Reduce Greenhouse Gas Emissions," May/Jun. 2005 *Radtech Report* pp. 12-13.
"Sartomer's Naturally Derived Products," date unknown, Sartomer Company: Paris, France. Available online at <sartomer.com/newsletter/3062.pdf; 2 pages.
"Sartomer Bio-Sourced Resins," Dec. 2008, Sartomer Company: Paris, France. 1 page.

(Continued)

*Primary Examiner* — Michael Pepitone
(74) *Attorney, Agent, or Firm* — Mueting, Raasch & Gebhardt, P.A.

(57) ABSTRACT

A novel UV-curable coating includes acrylated soybean oil, a hyperbranched acrylate, an optional adhesion promoter, and an optional renewable reactive diluent.

12 Claims, 16 Drawing Sheets

(56) References Cited

OTHER PUBLICATIONS

Shi et al., "applications of rosin-modified epoxidized soya bean oil acrylate in UV cure coatings," 1992 *J. Photopolymer Sci. Technol.* 5:453-459.

"Soy-Based Paints and Coatings," Technical Data Review: United Soybean Board. Copyright 2010.

Thames et al. "Cationic UV-cured coatings of epoxide-containing vegetable Oils," 1999 *Surface and Coatings Technology* 115:208-214.

Wicks et al. *Organic Coatings: Science and Technology, Third Edition* John Wiley & Sons Inc.: Hoboken, NJ; Copyright 2007. Published on line on Apr. 14, 2006. Cover page, publisher's page, table of contents, and preface; 17 pages.

Wu et al. "Effect of hyperbranched acrylates on UV-curable soy-based biorenewable coatings," Apr. 4, 2011 *Polymer Int.* 60:571-577. Available online on Dec. 3, 2010.

Bhardwaj et al., "Modification of Brittle Polylactide by Novel Hyperbranched Polymer-Based Nanostructures," Aug. 2007 *Biomacromolecules.* 8:2476-2484. Available online on Jul. 3, 2007.

Burak, "The success of UV/EB curing: environmental compliance, performance and safety," Nov. 1, 1997 *J. Coatings Technol.* 69:29-32.

Cai et al. "Influence of Reactive Diluents on UV Curing Acrylic Epoxidized Soybean Oil System," Feb. 2006 *Tuliao Gongye (Paint & Coating Indust.)* 35(2):12-15. English language summary included.

Chattopadhyay et al. "Effect of Chain Extender on Phase Mixing and Coating Properties of Polyurethane Ureas," Mar. 16, 2005 *Indust. Eng. Chem. Res.* 44:1772-1779. Available online on Feb. 8, 2005.

Chen et al. "Study of cationic UV curing and UV laser ablation behavior of coatings sensitized by novel sensitizers," May 17, 2006 *Polymer* 47:3715-3726. Available online on Apr. 18, 2006.

Chen et al. "UV-curable, oxetane-toughened epoxy-siloxane coatings for marine fouling-release coating applications," Jun. 2008 *Polymer Int.* 57:879-886. Available online on Mar. 31, 2008.

Chen et al. "Study of epoxidized-cardanol containing cationic UV curable materials," Jun. 2009 *Prog. Org. Coatings* 65(2):246-250.

Chen, "Development of 'sweet,' soy-based, high biorenewable content UV curable coatings," proceedings paper presented at the UV&EB 2010 Technology Expo and Conference. Sponsored by RADTECH (The Associate for UV&EB Technology). Baltimore, MD: May 23-26, 2010. Published in the Winter 2011 *RadTech Report*; 12 pages.

Chen et al. "Development of 'sweet' soy-based, high biorenewable content UV curable coatings," Proceedings paper, 17 pages. Presented at *The 37th Annual Waterborne Symposium, Advances in Sustainable Coatings Technology Meeting.* New Orleans, LA: Feb. 10-12, 2010.

Cheng et al. "Synthesis and properties of semi-crystalline hyperbranched poly(ester-amide) grafted with long alkyl chains used for UV-curable powder coatings," Jul. 2, 2007 *Prog. Org. Coatings* 59:284-290.

Chougrani et al. "Acrylate based anticorrosion films using novel bis-phosphonic methacrylates," Dec. 15, 2008 *J. Polym. Sci. Part A: Polym. Chem.* 46:7972-7984. Available online on Nov. 11, 2008.

Demirbas, "Biofuels: Securing the Planet's Future Energy Needs," 2009 *Energy Convers. Management* 50:2239-2249. Available online on Jun. 16, 2009.

Dzunuzovic et al. "UV-curable hyperbranched urethane acrylate oligomers containing soybean fatty acids," Feb. 1, 2005 *Prog. Org. Coatings* 52:136-143.

Flory et al. "Molecular Size Distribution in Three Dimensional Polymers. VI. Branched Polymers Containing A—R—$B_{f-1}$ Type Units," Jun. 1, 1952 *J. Am. Chem. Soc.* 74:2718-2723.

Gao et al. "Hyperbranched polymers: from synthesis to applications," Mar. 2004 *Prog. Polym. Sci.* 29:183-275.

Gerbase et al. "Dynamic mechanical and thermal behavior of epoxy resins based on soybean oil," Aug. 2002 *J. Am. Oil Chemist's Soc.* 79:797-802.

Grundmeier et al. "Adhesion and De-Adhesion Mechanisms at Polymer/Metal Interfaces: Mechanistic Understanding Based on In Situ Studies of Buried Interfaces," Aug. 2005 *Ann. Rev. Mater. Res.* 35:571-615. Available online on Apr. 1, 2005.

Gu et al. "Cationic UV-cured coatings containing epoxidized soybean oil initiated by new onium salts containing tetrakis(pentafluorophenyl)gallate anion," Apr. 1, 2002 *J. Coatings Technol.* 74(927):49-52.

Guo et al. "Structure and properties of halogenated and nonhalogenated soy-based polyols," Nov. 1, 2000 *J. Polym. Sci. Part A: Polym. Chem.* 38:3900-3910. Available online on Sep. 12, 2000.

Hatti-Kaul et al. "Industrial biotechnology for the production of bio-based chemicals—a cradle-to-grave perspective," Mar. 2007 *Trends Biotechnol.* 25:119-124.

Hong et al. "Synthesis and characterization of a hyperbranched polyol with long flexible chains and its application in cationic UV curing," Aug. 8, 2000 *J. Appl. Polym. Sci.* 77:1353-1356. Available online on Jun. 21, 2000.

Huang et al. "Relation of Monomer Structure with Thermal Stability of UV Coatings Film," Dec. 2004 *Tuliao Gongye (Paint & Coating Indust.)* 34(12):1-4. English language summary included.

Huang et al. "Self-initiated photopolymerization of hyperbranched acrylates," Aug. 26, 2009 *Polymer* 50:4325-4333. Available online on Jul. 8, 2009.

Johansson et al. "Radiation curing of hyperbranched polyester resins," Jan. 31, 2000 *J. Appl. Polym. Sci.* 75:612-618. Available online on Jan. 7, 2000.

Joshi et al. "Green coatings: a trend that is becoming the rule rather than the exception," Jan. 1, 2008 *JCT CoatingsTech.* 5:38-43.

Lee et al. "Phase separation and phase inversion of polyurethane networks," Jul. 1996 *J. Polym. Res* 3:159-163.

Lu et al. "New sheet molding compound resins from soybean oil. I. Synthesis and characterization," Jan. 6, 2005 *Polymer* 46:71-80. Available online on Nov. 18, 2004.

Mathlouthi et al. (Eds.), *Sucrose: Properties and Applications.* Blackie Adaemic and Professional: Glasgow; publication date Apr. 30, 1994, copyright 1995. Cover page, publisher's page, and table of contents; 8 pages.

Matyjaszewski et al. "Preparation of Hyperbranched Polyacrylates by Atom Transfer Radical Polymerization. 1. Acrylic AB* Monomers in "Living" Radical Polymerizations," 1997 *Macromolecules* 30:5192-5194. Available online on Aug. 25, 1997.

Miller et al. "Properties of polyether-polyurethane block copolymers: effects of hard segment length distribution," Jan. 1985 *Macromolecules* 18:32-44.

Mori et al. "Hyperbranched (Meth)acrylates in Solution, Melt, and Grafted From Surfaces," 2003 *Topics Curr. Chem.* 228:1-37.

Ni "Effect on Performance on UV-curable urethane acrylates with annealing," 2001 *Shanghai Tuliao.* 39:6-8. English language abstract included.

Patil et al. "Sucrose diacrylate: A unique chemically and biologically degradable crosslinker for polymeric hydrogels," Aug. 1997 *J. Polym. Sci. Part A: Polym. Chem.* 35:2221-2229.

Pavlova et al. "Novel Hyperbranched Polymers for Polyurethane Coatings: Their Preparation and Crosslinking with Polyisocyanates," 2004 *Polym. Preprints* 45:217-218.

Pelletier et al., "Acrylated vegetable oils as photocrosslinkable materials," Mar. 15, 2006 *J. App. Polym. Sci.* 99:3218-3221. Available online on Jan. 19, 2006.

Petersen et al., "Potential of biobased materials for food packaging," Feb. 1999 *Trends in Food Science & Technology* 10:52-68.

Pettersson "Hyperbranched Polymers—Unique Design Tools for Multi Property Control in Resins and Coatings," 1996 *Pigment & Resin Technology* 25:4-14.

Raghavachar et al., "Cationic UV Cured Coatings Using Epoxidized Soybean Oil," Oct. 2000 *Radtech Report* 72:125-133.

Richard et al., "Mechanism of thermal degradation of sucrose. A preliminary study," 1978 *Aust. J. Chem.* 31:1825-1832.

Sangermano et al., "Phenolic Hyperbranched Polymers as Additives in Cationic Photopolymerization of Epoxy Systems," May 2004 *Macromol. Mater. Eng.* 287:442-445. Available online on May 3, 2004.

Sangermano et al., "Cationic photopolymerization of oxetane-functionalized hyperbranched polymers," Jul. 5, 2005 *J. Appl. Polym. Sci.* 97:293-299. Available online on Apr. 22, 2005.

(56) References Cited

OTHER PUBLICATIONS

Schmaljohann et al., "New coating systems based on vinyl ether- and oxetane-modified hyperbranched polyesters," Feb. 2000 *Macromol. Mater. Eng.* 275:31-41.

Schmidt et al., "Time-intensity transformation and internal stress in UV-curable hyperbranched acrylates," May 2007 *Rheol Acta.* 46:693-701. Available online on Feb. 17, 2007.

Schwalm et al. "Graphic optimization," 2008 *Eur Coat. J.* 2: 8 pages.

Sharma et al. "Addition polymers from natural oils—A review," Nov. 2006 *Prog. Polym. Sci.* 31:983-1008.

Shi et al., "Photopolymerization of dentritic polymers and their applications for coatings," 2001 *Trends Photochem. Photobiol.* 7:131-145.

Teng et al., "Blown Soybean Oil Ceramer Coatings for Corrosion Protection," Nov. 2003 *Macromol. Mater. Eng.* 288:844-851. Available online on Nov. 18, 2003.

Tey et al., "Mechanical properties of UV-curable polyurethane acrylate used in packaging of MEMS devices," Proceedings Paper of the International Conference on Materials for Advanced Technologies (ICMAT 2005) Symposium H: Silicon Microelectronics: Processing to Packaging—ICMAT 2005 Symposium H. Published May 10, 2006, in *Thin Solid Films* 504:384-390.

Velankar et al. "UV-curable urethaneurea acrylates via deblocking urea linkages," 1995 *Polym Mater Sci Eng.* 73:506-507.

Voit, "Hyperbranched polymers—All problems solved after 15 years of research?" Jul. 1, 2005 *J. Polym. Sci. Part A: Polym. Chem.* 43:2679-2699. Available online on May 17, 2005.

Wang et al., "Enzymatic Hydrolysis of Corn Cob Residues from Furfural Production," Sep. 2007 *Chinese J. Environ. Sci.* 9:2129-2133. English language abstract included.

Xie et al. "Study on the properties of UV curing epoxidized soybean oil acrylate coatings cured film," 2002 *Shanghai Tuliao* 40:9-10. English language summary included.

Zheng et al. "Phase separation and mechanical responses of polyurethane nanocomposites," Oct. 18, 2006 *Polymer* 47:7786-7794. Available online on Sep. 25, 2006.

Zhu et al. "Studies on the Photoreactive Coating of Acrylated Epoxidized Soybean Oil," 1992 *Hebei Gong xueyuan Xuebao (Journal of Hebei Institute of Technology)* 21:8-18. English language abstract included.

\* cited by examiner

PLANT OIL-BASED UV-CURABLE COATING

This application claims the benefit of U.S. Provisional Application Ser. No. 61/439,592, filed Feb. 4, 2011, which is incorporated herein by reference in its entirety.

BACKGROUND

The accelerating depletion of petroleum reserves and increasing cost of petrochemicals make the utilization of renewable raw materials a necessary step towards sustainable development. Current coating technologies consume numerous petroleum chemicals and much energy, while releasing hazardous volatile organic content, such as organic solvents, into the environment (Cheng et al., 2007 Prog Org Coat 59:284-290).

New, environmentally friendly coating technologies are being actively developed and applied by the coating industry, as driven by stricter environmental regulations. UV-curable coating technology, which produces solidified coatings within seconds upon irradiation with UV light, is a very promising "green" coating technology. This solventless energy-efficient technology offers high productivity and premium coating quality (Cheng et al., 2007 Prog Org Coat 59:284-290; Pelletier et al., 2006 J App Polym Sci 99:3218-3221; Shi et al., 1992 J Photopolym Sci Technol 5:453-459; Sangermano et al., 2005 J Appl Polym Sci 97:293-299; Huang et al., 2009 Polymer 50:4325-4333). However, coating systems based on petrochemical-derived acrylate oligomers and monomers are still the predominant sector of the UV-curable coating market.

SUMMARY OF THE INVENTION

The invention provides a novel UV-curable plant oil-based formulation for use on surfaces such as metal, wood, paper, textiles and plastic. The formulation can be incorporated into or used to form a coating, film, adhesive or ink, for example. The term "coating" as used herein is meant to refer to coatings, films, adhesives, inks, etc. for ease of reference.

In some embodiments, the UV-curable formulation is soy-based. High in soy and biorenewable materials content, the coating formulations exhibit good adhesion on metal, as well as superior corrosion protection performance.

In some embodiments, the high renewable content, UV-curable coating formulations include an acrylated soybean oil, a hyper-branched acrylate, an optional adhesion promoter, and an optional reactive diluent, preferably a renewable reactive diluent.

Accordingly, in one aspect, the invention provides a composition comprising a plant oil and a highly branched cross-linking agent. The plant oil is preferably functionalized with one or more double bonds; more preferably it is an acrylated plant oil such as acrylated epoxidized soybean oil. The highly branched cross-linking agent is preferably functionalized with one or more double bonds and is preferably a highly branched or hyperbranched acrylate such as a hyperbranched polyester acrylate. The highly branched acrylate can be present in the composition in an amount of between about 5% and about 40% of the composition, by weight.

Optionally, the composition further includes a reactive diluent. An example of a reactive diluent is one that contains one or more double bonds such as a tetrahydrofurfural acrylate. The reactive diluent can be present in an amount up to about 50% of the composition, by weight. Also optionally, the composition can further include a photoinitiator. The photoinitiator can be present in an amount up to about 10% of the composition, by weight. Also optionally, the composition can further include an adhesion promoter. The adhesion promoter can be present in an amount up to about 10% of the composition, by weight. A particular preferred composition contains an optional photoinitiator in an amount of 0 to 10% of the composition, by weight; an optional reactive diluent in an amount of 0 to 50% of the composition, by weight; a hyper-branched acrylate in an amount of 5 to 40% of the composition, by weight; an optional adhesion promoter in an amount of 0 to 10% of the composition, by weight; and acrylated plant oil to 100% of the composition, by weight. In a preferred embodiment, the composition has a biorenewable content of at least 40%, by weight.

In another aspect, the invention provides a coating, film, adhesive or ink comprising the composition of the invention. The coating, film, adhesive or ink can be cured in any suitable fashion; for example, it can be UV-cured or thermally cured.

In yet another aspect, the invention provides an article or surface comprising the coating, film, adhesive or ink of the invention.

DETAILED DESCRIPTION OF ILLUSTRATIVE EMBODIMENTS

Figure 1:
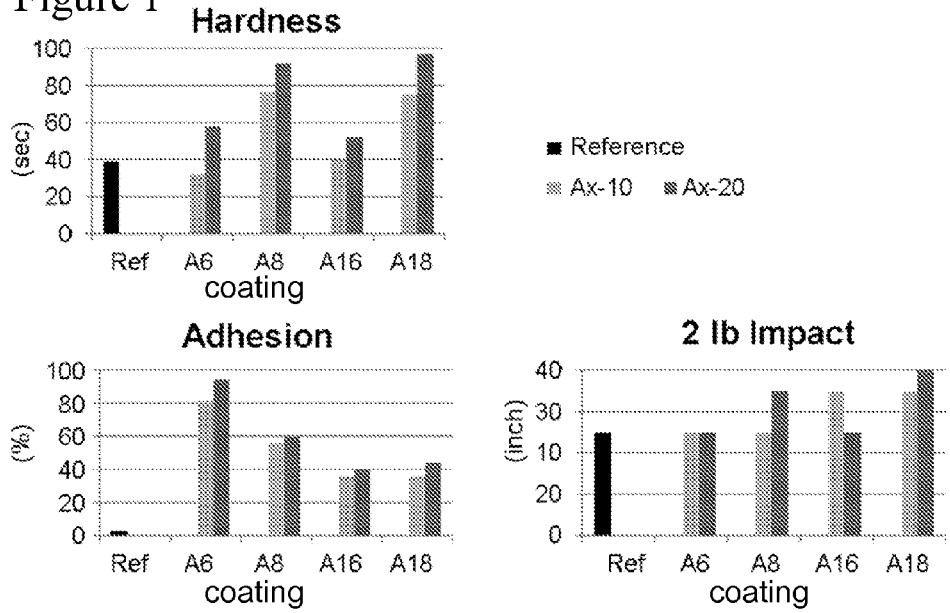
FIG. 1 shows a comparison of coating mechanical properties.

The invention provides a novel curable plant oil-based formulation that incorporates a highly branched cross-linking agent. In preferred embodiments, the invention provides a soy-based UV-curable coating formulation for protection of metal and wood. High in soy and biorenewable materials content, the coating formulations exhibit good adhesion on metal as well as superior corrosion protection performance.

In preferred embodiments, the high soy and renewable content, UV-curable coatings of the invention include acrylated soybean oil, a hyper-branched acrylate, an optional adhesion promoter, and an optional reactive diluent, preferably a renewable reactive diluent. They exhibit good coating properties as well as good anti-stain, and anti-corrosion performance directly on aluminum after 1000 hours salt spray test.

Others have reported coating formulations based on 10% epoxidized soybean oil and requiring the use of a more expensive synthetic cycloaliphatic epoxy. These coatings were not as effective as the present coating to prevent corrosion on a steel panel. (Surface and Coatings Technology, Vol 115, 2-3, p 208-214, 1999.)

The coatings of the invention can be applied directly to metal, wood, paper, plastic or textile surfaces, or as top layers on surfaces that have been coated or stained with other materials.

The UV-curable coating compositions of the invention contain an acrylated plant oil, such as acrylated soybean oil (ASBO), and a highly branched cross-linking agent, preferably a hyperbranched acrylate (HBA). Preferably, the formulation further includes an adhesion promoter. Optionally, the formulation further includes a reactive diluent, and/or a photoinitiator. In some embodiments, the reactive diluent is omitted. In embodiments that utilize a thermal cure instead of a UV cure, the photoinitiator may be omitted.

The plant oil can be a vegetable oil or a nut oil. Exemplary plant oils include vegetable oils such as soybean oil, linseed oil, sunflower oil, safflower oil, canola oil, or corn oil, and nut-based oils such as cashew nut oil. Soybean oil is preferred. The plant oil preferably is functionalized with one or more double bonds; preferably it is an acrylated plant oil. Acrylated plant oils, also known as acrylated epoxidized plant oils, are typically epoxy acrylates prepared from epoxidized plant oils by reacting the epoxide with acrylic acid to produce hydroxyacrylates. For example soybean oil (SBO), when epoxidized, becomes epoxidized soybean oil (ESO). When treated with acrylic acid, ESO becomes acrylated soybean oil (ASBO). A preferred acrylated plant oil is an acrylated epoxidized soybean oil such as Ebecryl® 860 (ASBO—a commercial acrylated epoxidized soybean oil, 3.4 acrylate group per soybean oil molecule) available from Cytec Industries, Inc.

The highly branched cross-linking agent can be a bio-based or petroleum based monomer or oligomer. The highly branched cross-linking agent is preferably an oligomer or polymer, and preferably functionalized with one or more acrylate functionalities. Examples of hyperbranched acrylates include hyperbranched urethane acrylates, hyperbranched polyurethane acrylates, hyperbranched polyol acrylates, and hyperbranched polyester acrylates. The highly branched cross-linking agent can be synthetic, or it can be derived from a renewable material. Preferred petroleum-based highly branched cross-linking agents are hyperbranched polyester acrylate oligomers. Hyperbranched polyester acrylates exhibit low viscosity and high functionality and are commercially available from, for example, Sartomer Company. Hyperbranched acrylates (HBA) contain at least 2 acrylate functionalities, preferably at least 4 or 6 acrylate functionalities. Examples include acrylates CN2300 (8 acrylate functionalities), CN2302 (16 acrylate functionalities), CN2303 (6 acrylate functionalities) and CN2304 (18 acrylate functionalities) available from Sartomer Company. Owing to their unique branched molecular structures, hyperbranched acrylates exhibit low viscosity, high molecular weight and functionality, and lower photopolymerization shrinkage. The use of hyperbranched acrylates can increase the coating hardness, adhesion, modulus, solvent resistance and glass transition temperature (Tg) of the coating formulation. The addition of higher Tg HBA to the lower Tg acrylated plant oil matrix causes the Tg of the UV-cured coating films to increase accordingly. Coating formulations containing hyperbranched acrylates exhibit balanced coating performance with reasonably high biorenewable content. Other advantages imparted by the HBA include more efficient crosslinking and better impact resistance of UV-cured film, making it less brittle; also less shrinkage during UV curing produces better adhesion to substrates.

Any hyperbranched or dendritic acrylate can be used in the formulation of the invention, without limitation. Acrylate functionality can be introduced into any convenient hyperbranched or dendritic polymer shell in order to yield a hyperbranched acrylate useful in the inventive composition. In some embodiments, acrylate functional bio-based hyperbranched oligomers derived from cashew nut shell liquid (CNSL) (Chen et al., International Patent Application No. PCT/US2012/020493, filed Jan. 6, 2012; Chen et al., 2009 Progress in Organic Coatings 65(2):246-250) can be utilized in addition to, or in place of, petroleum based or synthetic HBAs, thereby boosting the biorenewable content of the coating formulation and potentially providing increased anti-corrosion performance. Because hyperbranched CNSL would likely increase the hydrophobicity of the coating, however, thereby increasing viscosity, the formulation may need to contain higher amounts of reactive diluent.

Interestingly, despite their high acrylate functionality, lower than expected acrylate photopolymerization conversion is reported for HBAs in the formulation of the present invention. The crosslink density of HBA-containing coatings, when compared to a reference coating, is decreased. Surprisingly, HBA oligomers can still form a tough crosslinked network even with lower acrylate conversion, and the mechanical and thermal properties for HBA-containing ASBO-based coatings actually improve in spite of the decreased crosslink density. This translates to a tough and better adhering film with improved impact resistance. These unique performance-enhancing effects of HBA, which are evident despite a reduction in crosslinking, were quite unexpected.

A reactive diluent is useful because acrylated plant oil is typically highly viscous. The reactive diluent can be petroleum-based or bio-based. A preferred reactive diluent is tetrahydrofurfural acrylate (THFA) which is a bio-based reactive diluent. THFA is commercially available from, for example, Sartomer Company. It is a derivative of furfural alcohol, a bio-derived chemical from a variety of agricultural by-products including corncobs, oat, wheat bran, sugarcane, bagasse, and sawdust.

The invention is not limited by the photoinitiator used to effect the UV cure. Exemplary photoinitiators include Irgacure 2022 (PI), a 1:4 by weight photoinitiator blend of phenylbis(2,4,6-trimethylbenzoyl)-phosphine oxide) and 2-hydroxy-2-methyl-1-phenyl-1-propanone, both commercially available from Ciba Specialty Chemicals.

The use of an adhesion promoter in the formulation is preferred, but optional. Formulations useful as metal coatings preferably include an adhesion promoter, such as a meth (acrylate) or acrylate phosphonic ester. Examples of adhesion promoters include Ebecryl® 168 and Ebecryl® 170 (UV curable acidic acrylate adhesion promoter on metal) that are commercial available from Cytec Industries, Inc.

The coating composition preferably includes a photoinitiator in amount ranging from 0% up to about 10% (by weight), including any value in between; a reactive diluent in an amount ranging from 0% up to about 50% (by weight), including any value in between; a highly branched acrylate in an amount ranging from about 5% up to about 40% (by weight), including any value in between; an adhesion promoter in an amount ranging from 0% up to about 10% (by weight), including any value in between; with acrylated plant oil making up the remainder of the composition. Some embodiments of the composition may contain incidental additional components such as leveling agents, wetting agents, and so on. Optional incidental additional components can include any additive of interest in a particular coating application, such as a filler, dye or pigment, binding agent, biocide, antifouling agent, plasticizer, preservative, thickener, tackifier, corrosion inhibitor, brightener, odorant, surfactant, defoamer, film forming aid, anti-oxidant, UV absorber, wax, matting agent, and the like. Examples of useful additives can be found in the Paint & Coating Institute's PCI-2011 Additives Handbook. It should nonetheless be understood that the composition is composed primarily of acrylated plant oil, highly branched acrylates, optional photoinitiator, optional reactive diluent, and optional adhesion promoter.

An exemplary composition includes these components:
Photoinitiator: 0 to 10%, wt %
Reactive diluent (e.g., THFA): 0 to 50%, wt %
HBA: 5 to 40%, wt %
Adhesion promoter: 0 to 10%, wt %
Acrylated plant oil (e.g., ASBO): to 100%, wt %
where wt % is the same as w/w and means "by weight."

A photoinitiator can be present in the following amounts, for example: 0 to 10%, wt %; 0- to 8%, wt %; 0 to 6%, wt %; 0 to 4%, wt %; 0 to 2%, wt %; 1 to 10%, wt %; 2 to 8%, wt %; and the like.

A reactive diluent can be present in the following amounts, for example: 0 to 50%, wt %; 0 to 40%, wt %; 0 to 30%, wt %; 0 to 20%, wt %; 0 to 10%, wt %; 5 to 50%, wt %; 10 to 50%, wt %; 10 to 40%, wt %; 10 to 30%, wt %; and the like.

A hyperbranched polymer, such as a hyperbranched acrylate, can be present in the following amounts, for example: 5 to 40%, wt %; 5 to 30%, wt %; 5 to 20%, wt %; 5 to 15%, wt %; 10 to 40%, wt %; 10 to 30%, wt %, and the like.

An adhesion promoter can be present in the following amounts, for example: 0 to 10%, wt %; 1 to 10%, wt %; 2 to 10%, wt %; 3 to 10%, wt %; 0 to 8%, wt %; 0 to 6%, wt %; 0 to 4%, wt %; 0 to 2%, wt %; 1 to 8%, wt %; 2 to 8%, wt %; 3 to 8%, wt %; 2 to 5%, wt %, and the like.

The biorenewable content of the formulation is preferably at least 40%, more preferably at least 50%, even more preferably at least 55%, and even more preferably at least 60%, wt %.

The formulation can take the form of a coating, film, adhesive or ink, for example. Coating formulations can be used to coat metal, wood, paper, textiles and plastic, without limitation. The coating has anti-corrosion and anti-stain properties, making it especially suitable for coating metal articles, objects and surfaces. Metal surfaces that can be coated include aluminum, steel, bronze, copper, nickel and bronze, as examples. The coating of the invention provides superior metal corrosion protection, but is also suitable for wood, plastic and paper coating.

The components of the coating formulation can be mixed together in advance, or immediately prior to curing. Coating formulations can be UV-cured or cured with a light emitting diode (LED) under standard conditions as exemplified in the following examples. In some instances, such as when a phosphine oxide photoinitiator is used, the coating formulation may be cured by exposure to sunlight or visible light emitting sources. Curing can be done at any temperature but preferably at room temperature. Electron beam (EB) can also be used to cure the coating formulations and, advantageously, generally obviates the need for a photoinitiator. Optionally, the coatings can be thermally annealed after curing in order to convert additional reactive acrylate groups, which enhances coating hardness and crosshatch adhesion and increases crosslink density. However, improvements in hardness and adhesion produced by thermal annealing may be offset by a decrease in the coating impact resistance of the annealed samples, indicating increased brittleness as a result of the higher crosslinking.

Also included in the invention is an article, surface or substrate that has been coated with the coating, film, adhesive or ink composition of the invention, whether cured or uncured, such as, without limitation, a coated article, surface or substrate, or an article formed from a composite.

The present invention is illustrated by the following examples. It is to be understood that the particular examples, materials, amounts, and procedures are to be interpreted broadly in accordance with the scope and spirit of the invention as set forth herein.

EXAMPLE 1

Effect of Hyperbranched Acrylates on UV-Curable Soy-Based Biorenewable Coatings Utilization of biorenewable components in UV-curable coating formulations is both economically and environmentally beneficial, particularly when compared to their petrochemical-based counterparts. To produce UV-curable coatings of high biorenewable content with enhanced performance, acrylated epoxidized soybean oil (ASBO) was combined with biorenewable reactive diluent tetrahydrofufurylacrylate, adhesion promoters, photoinitiator and hyperbranched acrylates (HBAs) as synthetic tougheners. The HBAs were found to impart high functionality and low viscosity, thus increasing crosslinking in the coating network and improving mechanical and thermal properties such as film hardness, adhesion, solvent resistance, impact resistance, tensile modulus and toughness, glass transition temperature and thermal stability. Real-time Fourier transform infrared spectroscopy showed decreased acrylate conversion when compared with a reference formulation without HBAs, which was attributed to earlier coating network vitrification during UV irradiation. ASBO-based coatings were also thermally annealed to allow further reaction of unreacted components in the vitrified network. As a result, coating properties were further improved. Overall, the addition of HBAs as synthetic tougheners to UV-curable ASBO-based biorenewable coating systems was shown to greatly improve the corresponding coating properties. See also Wu et al. April 2011 *Polymer International* 60:571-577.

Introduction

Utilization of natural resources in UV-curable formulations provides a promising "green+green" solution to the coating industry that is facing stricter environmental regulations and higher raw material costs. UV-curable coating materials with high biorenewable content, comparable coating performance to petrochemical-based formulations and lower cost are highly desirable. Soybean oil (SBO) is a low-cost biorenewable resource with high annual excess production in the USA (Biswas et al., 2008 Energy Environ Sci 1:639-644; Lu et al., 2004 Polymer 46:71-80). Commercialized SBO derivatives, such as acrylated epoxidized soybean oil (ASBO), are important starting materials for the development of soy based materials such as coatings, adhesives, plasticizers, inks and lubricants (Pelletier et al., 2006 J App Polym Sci 99:3218-3221; Shi et al., 1992 J Photopolym Sci Technol 5:453-459; Lu et al., 2004 Polymer 46:71-80; Gerbase et al., 2002 J Am Oil Chem Soc 79:797-802; Guo et al., 2000 J Polym Sci A: Polym Chem 38:3900-3910). Curing ASBO alone produces films with inferior properties to their petrochemical-based counterparts, which can be attributed to the soft SBO structure and lower acrylate functionality. Formulations containing both ASBO and petrochemicals exhibit enhanced adhesion, viscosity, chemical resistance, curing time and gloss (Zhu et al., 1992 Hebei Gongxueyuan Xuebao 21:8-18), but the biorenewable contents of the formulations are lower (Dzunuzovic et al., 2005 Prog Org Coat 52:136-143; Xie et al., 2002 Shanghai Tuliao 40:9-10).

Combining harder monomers possessing higher acrylate functionality with ASBO is expected to produce UV-curable coatings with better crosslinking and thus greatly enhanced coating film properties. In order to maintain high biorenewable content, it is required that such monomers have high toughening efficiency. One promising monomer for this purpose is found in the growing field of hyperbranched polymers. Hyperbranched polymers are analogues of the dendritic polymers first described by Flory in 1952 (Flory, 1952 J Am Chem Soc 74:2718-2723). These lower-cost hyperbranched polymers have been touted for properties such as high functionality, fast curing time, high solubility and low viscosity (Cheng et al., 2007 Prog Org Coat 59:284-290; Froehling, 2004 J Polym Sci A: Polym Chem 42:3110-3115; Gao and Yan, 2004 Prog Polym Sci 29:183-275; Hong et al., 1999 J Appl Polym Sci 77:1353-1356; Johansson et al., 1999 J Appl Polym Sci 75:612-618; Mori and Muller, 2003 Topics Curr Chem 228:1-37; Pettersson, 1996 Pigment Resin Technol 25:4-14; Schmidt et al., 2007 Rheol Acta 46:693-701; Schmaljohann et al., 1999 Macromol Mater Eng 275:31-41), as well as contributing to improvement of thermal properties (Sangermano et al., 2005 J Appl Polym Sci 97:293-299; Schmidt et al., 2007 Rheol Acta 46:693-701; Pavlova et al., 2004 Am Chem Soc Polym Prepr 45:217-218; Voit, 2005 J Polym Sci A: Polym Chem 43:2679-2699; Sangermano et al., 2005 Macromol Mater Eng 289:442-446). Hyperbranched acrylates (HBAs) have been shown to be effective low-viscosity toughening agents for acrylate-based UV-curable coatings (Huang et al., 2009 Polymer 50:4325-4333; Matyjaszewski et al., 1997 Macromolecules 30:5192-5194; Klang, "Radiation Curable Hyperbranched Polyester Acrylates," *Paint & Coatings Industry* April 2007, pages 98-101). However, the application of HBAs in soy-based UV curable coatings has not been reported. The research progress in utilizing HBAs in soy-based UV-curable coating systems to achieve high biorenewable-content and higher performance coating materials is described in this paper.

Reactive diluents are commonly used in UV-curable formulations to reduce the formulation viscosity to applicable level, and to enhance the system mobility for better conversion of the functional groups during photopolymerization. Tetrahydrofurfuryl acrylate (THFA) is a derivative of furfural, which is produced from biorenewable sources such as agricultural waste including corn cobs and sugarcane bagasse (Milovanov and Corona, 1971 Memoria de la Conferencia ATAC 38:814-829; Wang et al., 2007 Chinese J Environ Sci 28:2129-2133). THFA has 60 wt % biorenewable content ("Sartomer bio-sourced resins," December 2008, Sartomer Company, Paris). The use of THFA as a reactive diluent in soy-based UV curable coatings is expected to improve coating properties by viscosity reduction and acrylate photopolymerization conversion enhancement as a result of higher system mobility during UV curing (Schmaljohann et al., 1999 Macromol Mater Eng 275:31-41; "Sartomer bio-sourced resins," December 2008, Sartomer Company, Paris; Cai et al., 2006 Tuliao Gongye 36:12-15).

Experimental

Materials

The chemicals used, abbreviations and sources are listed in Tables 1 and 2. All chemicals were used as received.

TABLE 1

| Trade name | Abbreviation | Source | Generic structure and description |
|---|---|---|---|
| Ebecryl 860 | ASBO | Cytec Industries Inc., Woodland Park, NJ | 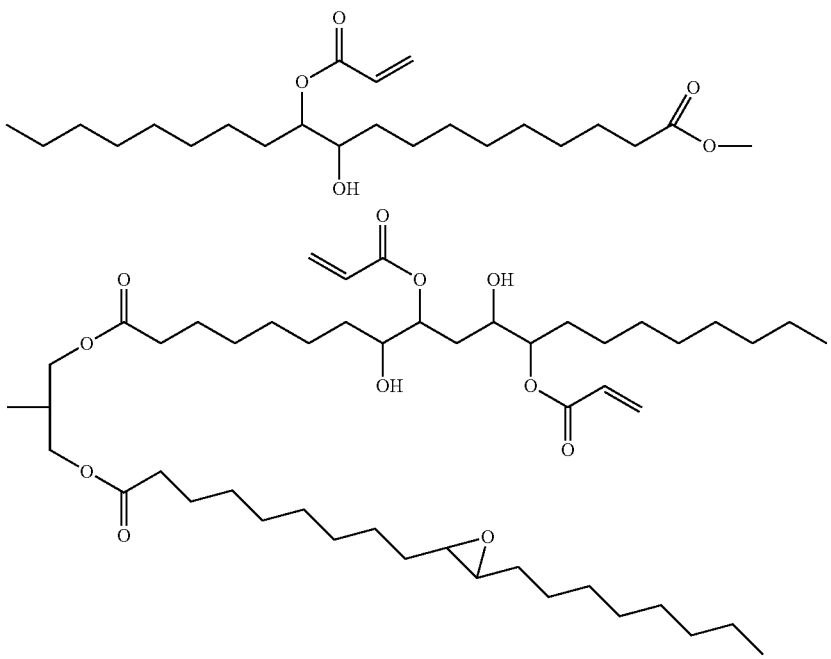 Epoxidized soybean oil acrylate |
| Ebecryl 168 and Ebecryl 170 | AP | Cytec Industries Inc., Woodland Park, NJ | Phosphated acidic adhesion promoter |
| SR 285 | THFA | Sartomer Company Inc., Exton, PA | 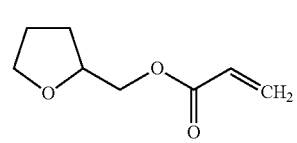 Tetrahydrofurfuryl acrylate |
| Irgacure 2022 | PI | Ciba Specialty Chemicals Freeport, TX | 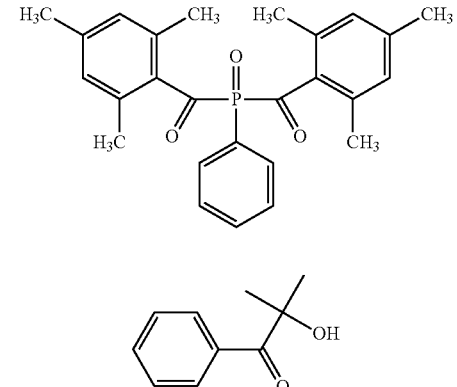 1:4 (by weight) photoinitiator blend of phenylbis(2,4,6-trimethylbenzoyl)phosphine oxide and 2-hydroxy-2-methyl-1-phenyl-1-propanone |

TABLE 2

Hyperbranched polyester acrylate oligomers from Sartomer Company Inc. and their properties
(Klang, "Radiation Curable Hyperbranched Polyester Acrylates,"
Paint & Coatings Industry April 2007, pages 98-101).

| Material | Abbreviation | Acrylate functionality | Acrylate equiv. weight (g mol$^{-1}$) | Surface tension at 25° C. (mNm$^{-1}$) | Tensile strength (psi) | Tensile elongation (%) | Tg by DMA (° C.) | Pencil hardness (at 200 fpm) |
|---|---|---|---|---|---|---|---|---|
| CN2303 | A6  | 6  | 194 | 40.3 | 7675 | 1.9 | 60  | 8H |
| CN2300 | A8  | 8  | 163 | 32.6 | 5360 | 4.5 | 96  | 3H |
| CN2302 | A16 | 16 | 122 | 37.8 | 7400 | 9.1 | 87  | 2H |
| CN2304 | A18 | 18 | 96  | 32.6 | 8750 | 1.1 | 181 | 5H |

Coating Formulation and Sample Preparation

Eight SBO-based coatings and a reference coating (Ref) were formulated as described in Table 3. The ingredients in each formulation were added to a 20 mL vial, slightly heated to lower the viscosity, then homogenized using a VWR analogue vortex mixer.

TABLE 3

Formulations prepared and studied

| Constituent | Ref (wt %) | Ax-10 (wt %) | Ax-20 (wt %) |
|---|---|---|---|
| ASBO | 72 | 62 | 52 |
| THFA | 20 | 20 | 20 |
| Ax   | 0  | 10 | 20 |
| AP   | 5  | 5  | 5  |
| PI   | 3  | 3  | 3  |

HBAs are notated by Ax, where x = acrylate functionality (6, 8, 16 or 18).
For example, A6-10 contains 10 wt % A6.

Soy-Based UV-Curable Coating Characterization

For coating physical property tests, the liquid coatings were cast on aluminium panels from Q-Lab Corporation with a drawdown block to form a thin film, about 100 μm thick, followed by UV curing using a Fusion LC6B Benchtop Conveyor with an F300 UVA lamp (UVA intensity of about 1180 mW cm$^{-2}$ measured using a UV Power Puck® II from EIT Inc.) in air at about 25% relative humidity. The curing protocol was one pass through the lamp with conveyor belt speed at 10 ft min$^{-1}$ (3 m min$^{-1}$). The coatings were tested after being conditioned in ambient laboratory conditions for at least 24 h. An automated surface-energy measurement unit manufactured by Symyx Discovery Tools Inc. and First Ten Angstroms was used to measure the water contact angle on UV-cured coating films. Droplets of water were deposited on the film surface and a CCD camera imaged the droplets; automated image analysis was used to determine the contact angle. Three drops of water were used for each measurement, and the average contact angle values were obtained. The standard deviation was about ±2°.

Hardness testing was performed with a BYK Gardener pendulum hardness tester in König mode, with the hardness being reported in seconds. Crosshatch adhesion was performed according to ASTM D3359. A 10×10 grid measuring approximately 1 inch square (25.4×25.4 mm) was cut into the cast film with a razor blade and the percentage of remaining squares reported after removal with adhesive tape. Two trials were averaged to give the reported results. Methyl ethyl ketone (MEK) double rubs were used to assess the solvent resistance of the cured coatings. A 26 oz (737 g) hammer with five layers of cheesecloth wrapped around the hammerhead was soaked in MEK for rubbing. After 100 double rubs, the cloth was rewet with MEK. The number of double rubs taken to mar the coating surface and expose the substrate, respectively, were recorded and reported. Falling weight direct impact testing was carried out according to ASTM D2794 with a 2 lb (908 g) weight. The starting height was increased until the film was damaged, and the maximum height at which the film was intact was recorded. The results were reported in inches. Tensile tests were performed using an Instron 5542 testing system (Instron Corp., Norwood, Mass.). ASTM D412-D dumbbell specimens were used. The strain rate was 0.2% s$^{-1}$.

Dynamic mechanical thermal analysis (DMTA) was performed using a TA Instruments Q800 DMA in rectangular tension/compression geometry. Free films of the cured materials were obtained by removing the material from the aluminium substrate using a razor blade. Sample size was 10×5 mm and film thickness was measured using a Micromaster® micrometer. The analysis was carried out from −50 to 150° C. at a frequency of 1 Hz and a ramp rate of 5° C. min$^{-1}$. The glass transition temperature (Tg) was obtained from the maximum peak in the tan δ curves. Crosslink density (ve) was calculated according to E'=3 $v_e$RT, where E' was determined in the linear portion of the storage modulus curve at least 50° C. greater than Tg. DSC experiments were performed utilizing a TA Instruments Q1000 DSC with a heat-cool-heat cycle. The sample size ranged from 5 to 7 mg. Temperature was ramped from −50 to 200° C. at 10° C. min$^{-1}$ in nitrogen.

The real-time Fourier transform infrared (RTIR) spectroscopic method provides a straight forward way to examine the photopolymerization behavior of UV-curable materials. RTIR spectroscopy experiments were performed using a Nicolet Magna-IR 850 Series II spectrometer with detector type DTGS KBr, with a UV optic fiber mounted in the sample chamber. The light source was a LESCO Super SpotMK II 100WDCmercury vapor short-arc lamp with a UVA bulb. Such a setup directly monitored functional group conversion as the photopolymerization proceeded. Samples were spin-coated onto a KBr plate at 3000 rpm for 15 s, followed by exposure to UV light in the RTIR beam for 60 s. Spectra were taken over a 120 s period at 2 spectra per second at a resolution of 4 cm$^{-1}$. The UV intensity was ca 36 mWcm-2 (UVA) as measured using a UV Power Puck® II from EIT Inc. The experiments were performed in air at 25±1° C. The acrylate conversion of ASBO and HBAs were calculated by the percent peak height decrease at ca 810 cm$^{-1}$. The functional group conversion at 120 s was reported and compared.

Results and Discussion

Effect of HBAS on ASBO-Based UV-Curable Coating Formulations

ASBO-based UV-curable coatings were formulated using various commercially available HBAs as primary toughening oligomers. THFA was added as a biorenewable reactive diluent, and synthetic adhesion promoters were used to enhance coating adhesion on the metal substrate. The UV-cured coating panels were tested and compared for film mechanical and thermal properties. FIG. 1 shows the coating mechanical properties. The addition of higher Tg HBAs to ASBO-based coating systems increases coating hardness, especially for formulations containing A8 and A18, the two higher Tg HBAs. Also, higher coating hardness is obtained with increased HBA addition. The hardness enhancement is attributed to the harder polyester backbone of the HBAs as compared to the softer ASBO backbone. The coating adhesion to aluminium substrate is greatly enhanced with HBA addition. For the reference coating, despite the addition of adhesion promoters, adhesion to aluminium is very poor, most probably due to the low polarity of the ASBO backbone and photopolymerization induced shrinkage. HBAs exhibit much lower photopolymerization shrinkage due to slightly lower photopolymerization conversion of acrylate groups, ultimately resulting in adhesion improvement (Huang et al., 2009 Polymer 50:4325-4333; Schmidt et al., 2007 Rheol Acta 46:693-701). Consequently, improved adhesion is observed with the addition of more polar HBAs to the ASBO matrix. Some coating impact resistance improvement is seen when compared with the reference coating. Coating adhesion and toughness are two dominating factors determining film impact resistance. The HBAs are higher molecular weight, low-viscosity, multi-acrylate functionalized oligomers; as a result, a tough crosslinked network can be formed even with lower acrylate conversion, which translates to a tougher and better adhering film with improved impact resistance.

Figure 2:
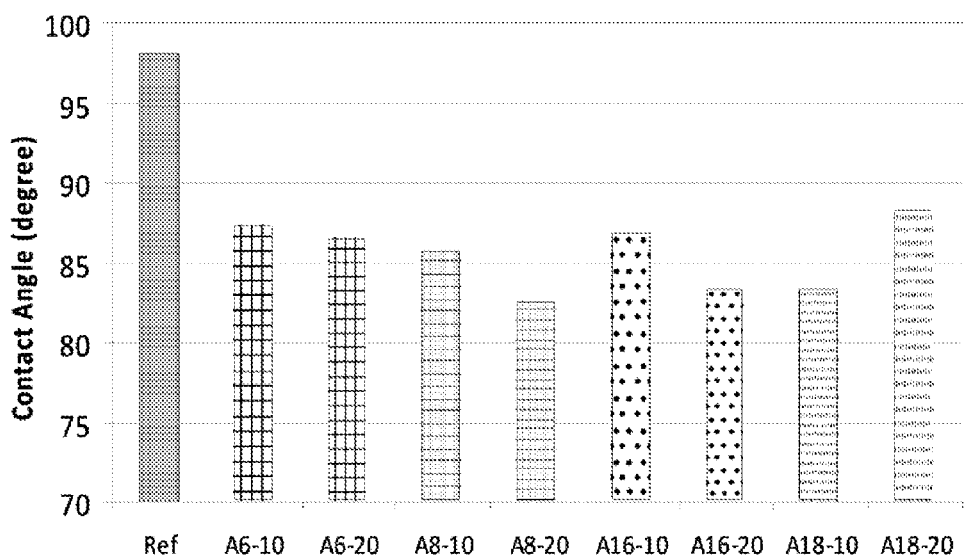
FIG. 2 shows water contact angle data for soy-based UV-curable coatings.

Water contact angle data of HBA-added coatings were obtained and are shown in FIG. 2. Compared to the reference coating, the addition of HBAs, which have more polar and hydrophilic polyester backbones, decreases the coating contact angle from ca 98° to ca 85°. Increasing HBA loading levels generally decreases the coating water contact angle.

Figure 3:
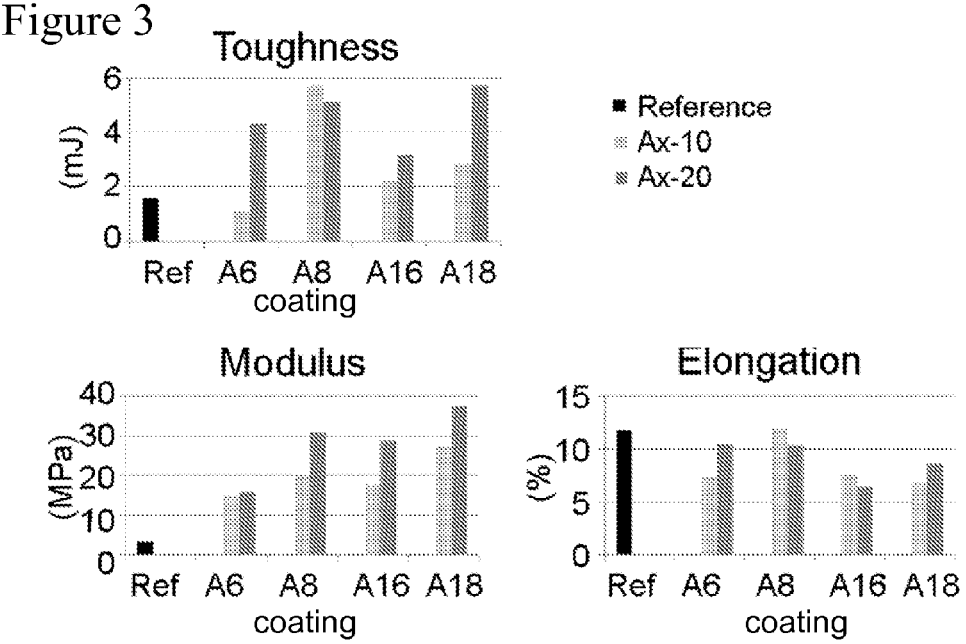
FIG. 3 shows a comparison of coating tensile modulus, elongation, and toughness.

Further examination of the coating mechanical properties was performed with tensile testing. The results are shown in FIG. 3. The coating film toughness is calculated from the area under the tensile modulus versus elongation curves. It is noticed that the two higher Tg HBAs, A8 and A18, contribute more to the toughness enhancement of the ASBO-based coatings than A6 and A16. The coating modulus increases significantly upon the addition of HBAs, as compared to the reference coating, due to the more rigid polyester backbone and higher Tg of the HBAs. Furthermore, with 20 wt % HBA, higher toughness and modulus are obtained than with 10 wt % HBA formulations. The coating film tensile elongation generally decreases with HBA addition, which is attributed to the increase in rigidity. However, the decrease of elongation is not as significant as the increase of tensile modulus after HBA addition; as a result, the coating toughness increases significantly. In general, the toughness enhancement trends with the coating impact resistance improvement when compared to the reference coating, which is considered one of the main reasons for impact resistance improvement.

Figure 4:
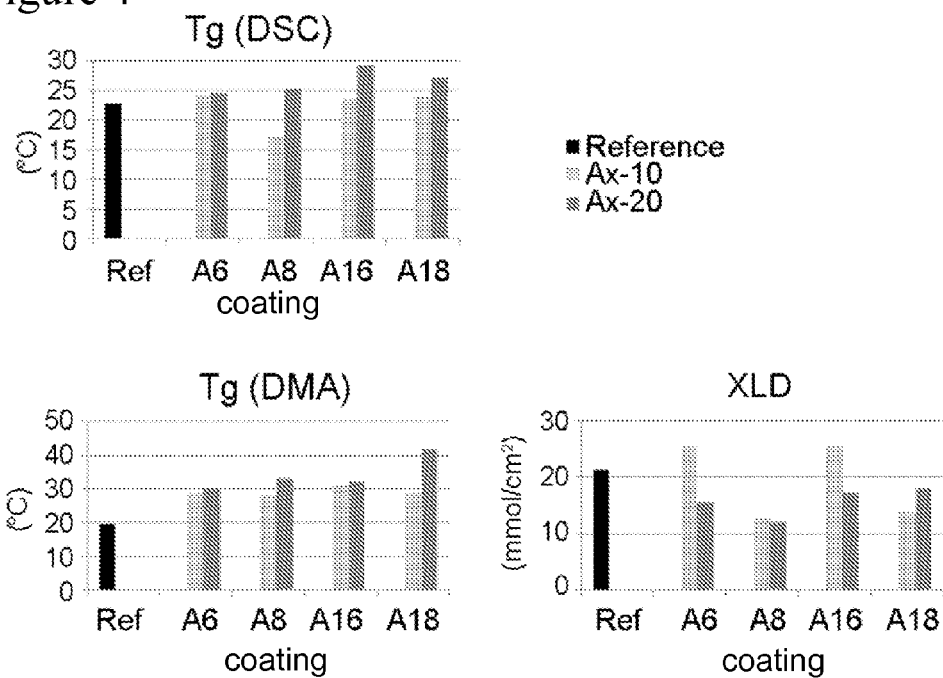
FIG. 4 shows a comparison of coating thermal properties (XLD, crosslink density).

FIG. 4 compares the soy-based coating Tg values and crosslink density data obtained from DSC and DMTA measurements. It is apparent that with the addition of higher Tg HBA to the lower Tg ASBO matrix, the Tg of UV-cured coating films increases accordingly. The increase in Tg of HBA-added coatings also correlates with the corresponding tensile modulus and pendulum hardness improvement. However, in general, the crosslink density of the coatings calculated from DMTA modulus decreases after HBA addition. Lower acrylate photopolymerization conversion is reported for HBAs due to earlier vitrification induced by the crosslinking of the multi-acrylate-functional, higher molecular weight hyperbranched molecules (Schmidt et al., 2007 Rheol Acta 46:693-701; Schwalm et al., 2008 Eur Coat J 2:26-31). Consequently, the decreased crosslink density of HBA-added coatings, when compared to the reference coating, is expected. It has been shown that the mechanical and thermal properties for HBA-added ASBO based coatings improve in spite of decreased crosslink density, confirming the unique performance-enhancing effect resulting from the structural features of HBA.

Figure 5:
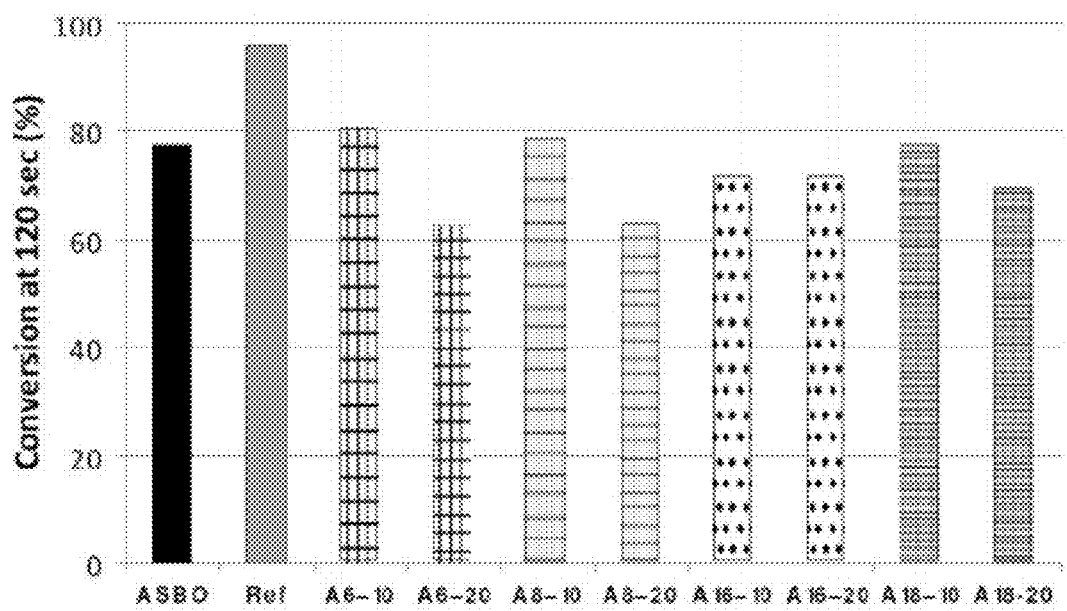
FIG. 5 shows an acrylate conversion of soy-based HBA-added UV-curable coatings as determined by RTIR spectroscopy experiments. Formulation ASBO is composed of ASBO and 3 wt % PI.

To examine the acrylate photopolymerization conversion of HBA-added coatings, RTIR spectroscopy experiments were conducted; the acrylate conversion data for these coatings are shown in FIG. 5. The pure ASBO coating exhibits acrylate conversion of about 78%. A higher acrylate conversion close to 95% is observed when THFA is added to the formulation. This is explained by the viscosity reduction effect from THFA, which allows for higher system mobility that results in higher functional group conversion (Schmaljohann et al., 1999 Macromol Mater Eng 275:31-41). Acrylate conversion decreases with HBA addition and further decreases with higher loading levels, which are caused by earlier vitrification induced by multi-functional HBAs (Schmidt et al., 2007 Rheol Acta 46:693-701; Schwalm et al., 2008 Eur Coat J 2:26-31). The RTIR acrylate conversion data corroborate observations reported in the literature, and explain the adhesion improvement paired with lower crosslink density recorded for HBA-added ASBO based coatings. Thermal annealing of UV-cured coating films was reported to further improve coating performance due to the additional conversion of residual acrylate functional groups 'frozen' in the vitrified network (Ni, 2001 Shanghai Tuliao 39:6-8; Velankar et al., 1995 Polym Mater Sci Eng 73:506-507; Tey et al., 2006 Thin Solid Films 504:384-390). The effects of the thermal annealing on these coatings will be discussed in the next section.

Figure 6:
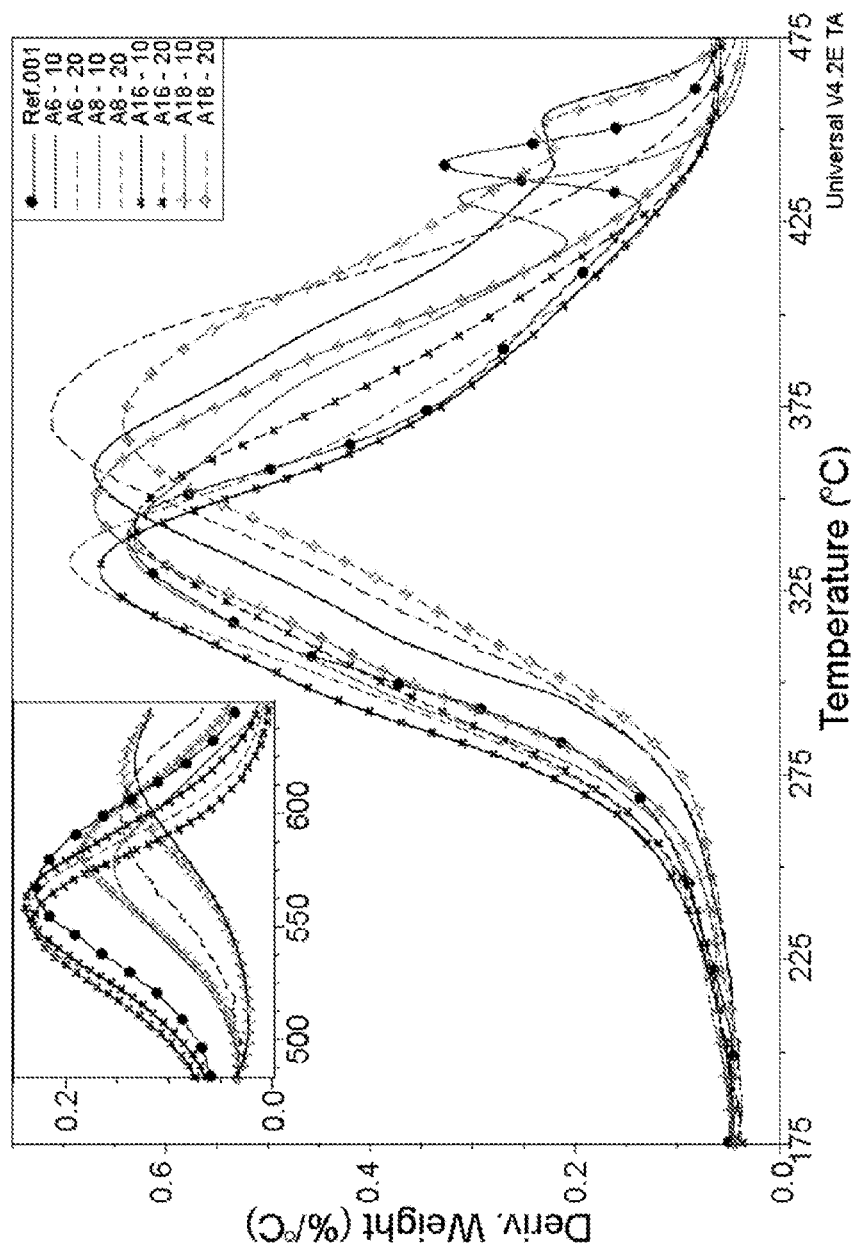
FIG. 6 shows an overlay of TGA weight loss rate as a function of temperature for soy-based UV-curable coatings.

The thermal stability of the HBA-added ASBO-based UV-curable coatings was assessed using TGA. The results are shown in FIG. 6. The samples exhibit a main decomposition peak at ca 350° C. and a secondary decomposition peak at ca 580° C. In general, higher HBA-loaded formulations decompose at a higher temperature. Less weight loss is observed in A6- and A18-added formulations at both 10 and 20 wt % loading levels as compared to other samples. As pure components, these HBAs are reported to have the highest hardness and tensile strength and lowest elongation values of the HBAs utilized in this study (Table 2). The higher crosslink density inferred from these data may be attributed the observed higher thermal stability (Huang et al., 2004 Tuliao Gongye 34:1-4).

Effect of Thermal Annealing on Soy-Based UV-Curable Coating Properties

Figure 7:
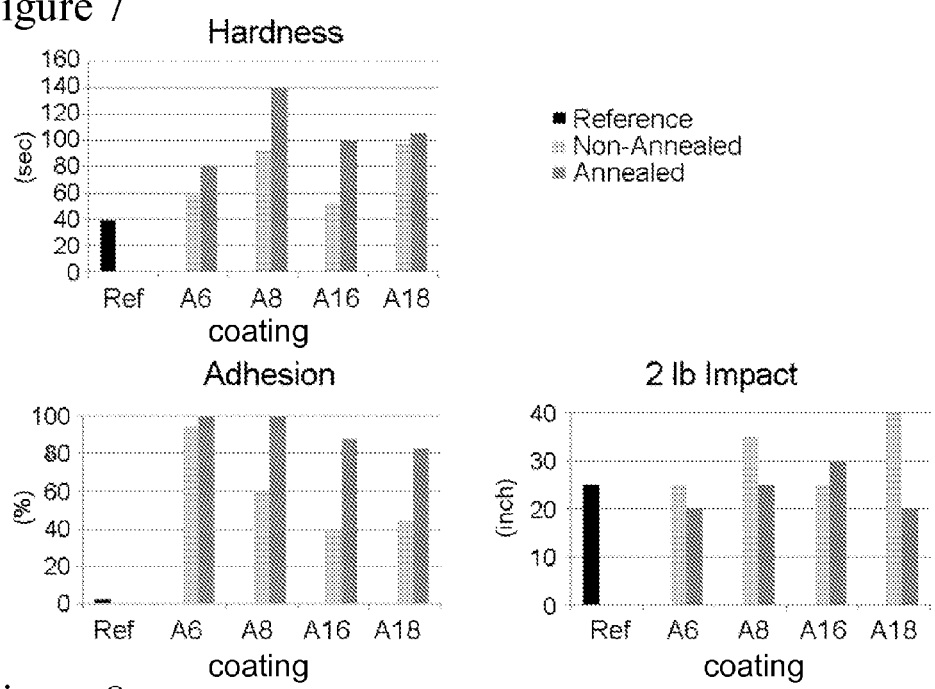
FIG. 7 shows a comparison of coating mechanical properties for annealed coatings versus non-annealed ones.
Figure 8:
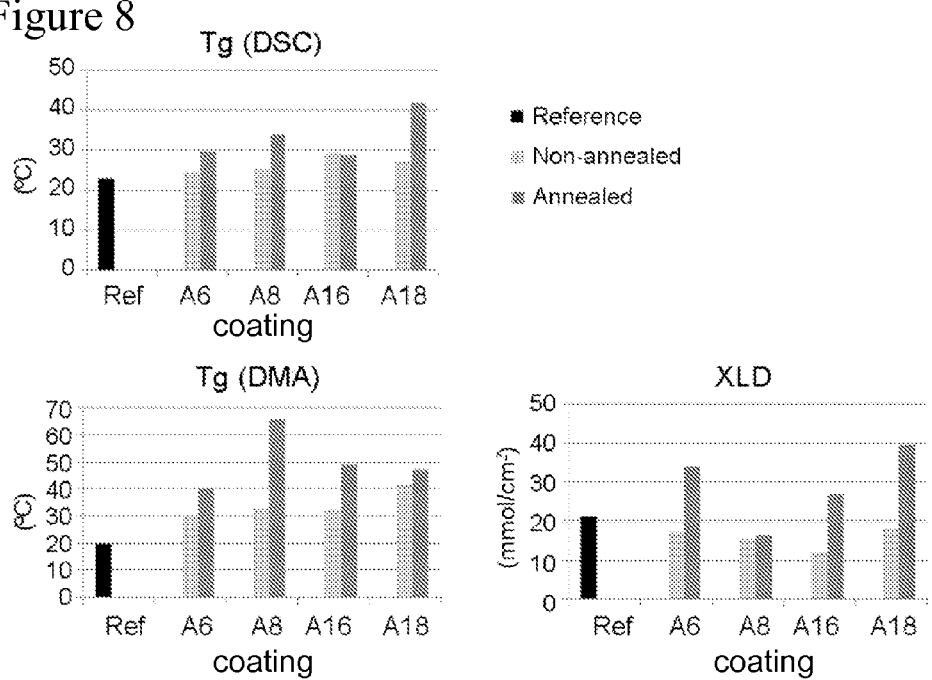
FIG. 8 shows a comparison of coating thermal properties for annealed coatings versus non-annealed ones (XLD, crosslink density).

As mentioned in the previous section, early photopolymerization induced vitrification in HBA-added formulations prevents complete conversion of reactive acrylate groups in the system. Thermal annealing was conducted on coating formulations containing 20 wt % HBA. During thermal annealing at temperatures above the coating Tg, the unreacted acrylate in the UV-cured coating films is able to regain mobility for further reaction (Ni, 2001 Shanghai Tuliao 39:6-8; Velankar et al., 1995 Polym Mater Sci Eng 73:506-507; Tey et al., 2006 Thin Solid Films 504:384-390). The effect of thermal annealing on soy-based coating properties is shown in FIGS. 7 and 8. As seen in FIG. 7, coating hardness and crosshatch adhesion are greatly enhanced by annealing. The hardness increase correlates with the higher Tg and improved crosslink density for annealed samples depicted in FIG. 8, suggesting further conversion of the residual acrylate group in the coating films upon thermal annealing. The significant adhesion improvement for annealed samples is attributed to both the anchoring effect and further acrylate reaction at the metal substrate surface upon thermal annealing. Despite the improvements to coating hardness and adhesion, the coating impact resistance decreases for annealed samples, indicating higher coating film brittleness as a result of much higher degree of crosslinking during thermal annealing.

In the preceding sections, it has been demonstrated that the addition of HBA oligomers in ASBO-based UV-curable coatings significantly enhances the soy-based coating materials' performance. The biorenewable content for the soy-based formulations is calculated to be 61.6 and 53.6 wt %, respectively, for 10 and 20 wt % HBA-added formulations. Such biorenewable content is reasonably high, considering the much enhanced coating performance these formulations exhibit. These soy-based high-biorenewable-content UV-curable coatings are promising 'green' coating materials which meet the increasing demand of cost-effective 'green' functional materials.

Conclusions

Polyester HBAs (10 and 20 wt %) with differing backbone Tg values and acrylate functionalities were formulated into ASBO-based UV-curable coatings flexibilized by THFA as a reactive diluent. The addition of HBAs greatly enhanced the coating hardness, adhesion, impact resistance, tensile modulus and toughness, and Tg. In contrast, acrylate photopolymerization conversion, coating film crosslink density and hydrophobicity decreased. The change of coating performance after HBA addition was attributed to the structural features of the more hydrophilic, higher Tg HBAs. In addition, it was shown that thermal annealing of the UV-cured coating films further enhanced the soy-based coating film properties such as hardness, adhesion and Tg, as a result of further reaction of residual acrylate groups in the coating films. The results showed that UV-curable coatings of reasonably high biorenewable content with much improved coating performance can be obtained using synthetic HBAs as efficient toughening agents.

EXAMPLE 2

Soy-Based, High Biorenewable Content UV Curable Coatings

Utilization of biorenewable materials in UV curing coatings technology is a "green+green" solution to sustainable development. In this work, acrylated epoxidized soybean oil based UV curable coating performance was significantly enhanced by incorporating synthesized acrylated sucrose and hyperbranched acrylates. Acrylated sucrose monomers were synthesized using solventless bulk reactions and characterized by mass spectroscopy and infra-red spectroscopy. Synthesized acrylated sucrose comprised of acrylated monomers with varying degree of acrylation, and the degree of acrylation of the acrylated sucrose increased with reaction time. Acrylated sucrose monomers obtained after 6 and 12 h reactions were formulated into acrylated soybean oil based UV curable coatings with commercial hyperbranched acrylates to produce biorenewable materials based UV curable coatings. Acrylated sucrose monomers increased the toughness but reduced the water resistivity and thermal stability of the coatings, the toughening effect was explained by the soft and hard micro phase separation in the cured coating films. Hyperbranched acrylates increased the coating hardness, adhesion, modulus, solvent resistance and glass transition temperature. Coating formulations containing both the acrylated sucrose monomers and the hyperbranched acrylates exhibited balanced coating performance with reasonably high biorenewable content. See also Chen et al. May 2011 *Progress in Organic Coatings* 71(1):98-109.

Introduction

The fast depleting petroleum reserve and the ever-increasing cost is attracting more serious attention to the industrial utilization of biorenewable raw materials in the chemical industry (Hatti-Kaul et al., 2007 Trends Biotechnol. 25:119; Benning and Pichersky, 2008 Plant J. 54:536-545). Organic coatings are an important sector of the modern chemical industry. Traditional coating systems contain significant amount of organic solvents and other volatiles. The coatings industry has been identified as the second only to the gasoline-automobile complex largest source of the VOC (volatile organic compound) pollutants that are responsible for excess ozone in the air (Wicks et al., *Organic Coatings: Science and Technology*, 3rd ed., John Wiley and Sons Inc., New Jersey, 2007). Driven by the rising raw material cost and the stricter environmental regulations, the coatings industry is transforming to a "greener" industry by incorporating more alternative renewable raw materials and "greener" technologies such as radiation cure, high solids, and waterborne coating technologies (Joshi et al., 2008 JCT Coat. Techol. 5:38; Orr, 2009 "Paints and Coatings: A Market Opportunity Study Update," available on the World Wide Web at soynewuses.org/). Radiation cure coating technology including UV (ultraviolet) and EB (electron beam) cure has the capability to produce high performance coatings with high productivity, low energy consumption and extremely low VOC emissions (Chen et al., 2008 Polym. Int. 57:879; "UV/EB Technology, A way to reduce greenhouse gas emissions," Radtech Rep. 2005; Golden, "Low Emission Technologies: A Path to Greener Industry," Radtech Rep. (May/June) 2005:14-18). It has been enjoying fast market growth since its introduction to the coatings industry (Orr, 2009 "Paints and Coatings: A Market Opportunity Study Update," available on the World Wide Web at soynewuses.org/; Burak, 1997 J. Coat. Technol. 69:29). Utilization of biorenewable raw materials in the radiation cure coatings is a promising "green+green" solution to the challenges that the coatings industry is facing.

Bio-derived chemicals such as drying oils have a long history of being used as coating ingredients. Bio-derived chemicals have features of environment benign and short regeneration cycles which meet the demand of a sustainable chemical industry (Benning and Pichersky, 2008 Plant J. 54:536-545). On the other hand, quality control, land uses, and logistic cost are potential issues in efficient utilizations of bio-derived materials. The intense research and development in the petroleum based chemical industry since early twentieth century has been providing the coatings industry with very cost effective, high quality raw materials. Thus, one major challenge in generating bio-based materials in order to substitute their petrochemical based counterparts is to match or even surpass the performance of petrochemicals based materials with competitive cost. Blending bio-derived ingredients into existing petrochemical based formulations is an intuitive approach to adopt bio-derived chemicals. However, normally lower biorenewable content products are produced in order to maintain the material performance, despite that high biorenewable content biobased materials are highly desired. An alternative approach to obtain high biorenewable content, high performance materials is to custom-design and formulate the resin and coating system according to specific application needs based on the understanding of structure-property relationships of bio-derived chemicals. With this approach it is expected that the structural features and the related material properties of the bio-derived chemicals can be fully utilized in the formulations to achieve optimal material performance. At the same time, due to the limited availability of biorenewable raw materials on the current market, use of petrochemicals in the formulations is inevitable. These petrochemicals and their addition amount should be carefully examined in order to maximize their effect with lowest loading level. In addition to material performance, there are other important aspects to consider and explore in the development of high biorenewable content biobased materials. For example, it is desirable that the biobased materials to disintegrate in the environment after use via mechanisms such as microorganism induced anaerobic or aerobic degradation, without releasing harmful fragments (Petersen et al., 1999 Trends Food Sci. Technol. 10:52). Consequently the degradability of these materials and the subsequent tracking and analysis of the released compounds are important research topics. On the other hand, from the application standpoint, the biobased materials must possess high enough durability throughout their service life time to withstand the erosion in their service environment such as microorganism induced deterioration, hydrolysis, weathering etc. These aspects are critical research topics in addition to formulation and performance enhancement of high biorenewable content biobased materials.

Soybean is a major produce in the US (Demirbas, *Biofuels, Securing the Planet's Future Energy Needs*, Springer, London, 2009). Soybean oil derived chemicals are important biorenewable materials in the coatings industry (United Soybean Board, 2008 "Technical data review: soy-based paints and coatings," available on the World Wide Web at soynewuses.org/; Teng and Soucek, 2003 Macromol. Mater. Eng. 288:844). Acrylated epoxidized soybean oil (ASBO) and epoxidized soybean oil (ESO) have been formulated into UV coatings but petrochemicals had to be incorporated into ASBO or ESO in order for better coating performance (Shi et al., 1992 J. Photopolym. Sci. Technol. 5:453; Zhu et al., 1992 Hebei Gong Xueyuan Xuebao 21:8; Cai et al., 2006 Tuliao Gongye 36:12; Gu et al., 2002 J. Coat. Technol. 74:49). As a result the biorenewable content was lower in these formulations. The softness of the fatty acid triglyceride backbone, and the lower reactivity for the mid-chain functional groups such as epoxies and acrylates are the main reasons for the inferior coating film properties (Raghavachar et al., 1998 RadTech Rep. 12:36; Sharma and Kundu, 2006 Prog. Polym. Sci. 31:983). In order to develop soy-based, high performance UV curable coatings with high biorenewable content, the effect of petroleum-based hyperbranched acrylates, and biorenewable tougheners and reactive diluents on ASBO based UV curable coatings was examined in this work.

Figure 9A:
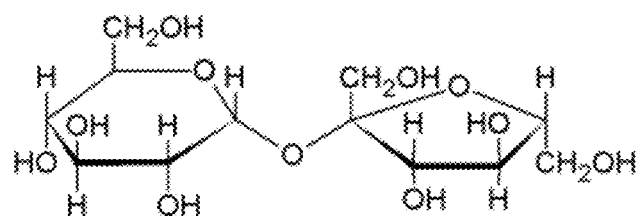
FIG. 9A shows the chemical structure of sucrose.
Figure 9B:
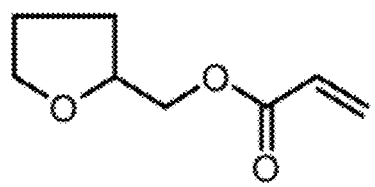
FIG. 9B shows the chemical structure of tetrahydrofurfural acrylate.

Commercial hyperbranched acrylates (HBAs) were selected to co-photopolymerized with ASBO. To the best of knowledge, the use of highly functional hyperbranched acrylates in soy-based UV curable materials has not been reported. Owing to their unique branched molecular structures, hyperbranched acrylates exhibit low viscosity, high molecular weight and functionality, and lower photopolymerization shrinkage (Shi et al., 2001 Trends Photochem. Photobiol. 7:131), which are expected to significantly increase the properties of the UV curable, soy-based formulations. As to the biobased toughening monomers and reactive diluents, the acrylated sucrose (AS) with varying acrylate functionality and tetrahydrofurfural acrylate (THFA) were selected. Sucrose (chemical structure shown in FIG. 9A), commonly known as table sugar, is an abundant low cost biorenewable resource in the US. The sucrose molecule possesses aliphatic ring structure and multiple hydroxyl groups. The aliphatic ring structure is expected to impart balanced hardness and flexibility to the material, and the hydroxyl groups to provide chemical modification sites and intermolecular hydrogen bonding. AS can be synthesized through various routes including transesterfication with methyl acrylates and methyl methacrylates (Knebel Joachim, Carbohydrate (meth)acrylates and their solvent-free preparation, 1995; Patil et al., 1997 J. Polym. Sci. Part A: Polym. Chem. 35:2221). But the effect of AS as a toughening ingredient in UV curable coatings has not been investigated, despite that the unique molecular structure of AS may significantly alter the soy-based UV cured coating properties. Commercial acrylated soybean oil has high viscosity, thus reactive diluents are necessary to lower the viscosity of ASBO-based coating formulations. THFA (structure shown in FIG. 9B) is a derivative of furfural alcohol, a bio-derived chemical from a variety of agricultural by-products including corncobs, oat, wheat bran, sugarcane bagasse, and sawdust (Ebert, 2008 "Furfural: future feedstock for fuels and chemicals," Biomass Mag., available on the World Wide Web at biomassmagazine.com/articlejsp?article id=1950). THFA has ~60% biorenewable content, and has low viscosity and high solvency towards common acrylate oligomers and monomers. It is an ideal biorenewable reactive diluent for high biorenewable content soy-based coating formulations. The research progress towards the production of high performance and high biorenewable content soy-based UV curable coatings by incorporation of HBAs, THFA and the acrylated sucrose is discussed in this contribution.

Experimental

Materials

Powderized sucrose was purchased from local grocery store. Methyl acrylate, potassium carbonate, tetrabutylammonium hydroxide, hydroquinone and phenothiazine were purchased from Aldrich. Ebecryl® 860 (ASBO—a commercial acrylated epoxidized soybean oil, 3.4 acrylate group per soybean oil molecule), Ebecryl® 168 and Ebecryl® 170 (UV curable acidic acrylate adhesion promoter on metal) were provided by Cytec Industries Inc. Hyperbranched polyester acrylates CN2300 and CN2304 (abbreviated as A8 and A18 respectively, specifications shown in Table 4), and SR285—tetrahydrofurfural acrylate (THFA), were provided by Sartomer Company Inc. Irgacure 2022 (PI), a 1:4 by weight photoinitiator blend of Phenylbis(2,4,6-trimethylbenzoyl)-phosphine oxide) and 2-hydroxy-2-methyl-1-phenyl-1-propanone, was provided by Ciba Specialty Chemicals.

TABLE 4

Properties of hyperbranched polyester acrylate oligomers from Sartomer Company Inc. (Klang, "Radiation Curable Hyperbranched Polyester Acrylates," Paint & Coatings Industry April 2007, pages 98-101).

| Trade name | Abbreviation | Acrylate functionality | Acrylate equivalent weight (grams/mol) | Surface Tensions (mN/m at 25° C.) | DMA $T_g$ (° C.) |
|---|---|---|---|---|---|
| CN2300 | A8 | 8 | 163 | 32.6 | 96 |
| CN2304 | A18 | 18 | 96 | 32.6 | 181 |

Synthesis and Characterization of Acrylated Sucrose (AS) and Methacrylated Sucrose (MAS)

The AS and MAS were synthesized in bulk following slightly modified procedures based on the procedures described in the literature (Knebel Joachim, Carbohydrate (meth)acrylates and their solvent-free preparation, 1995). Atypical procedure for the synthesis of acrylated sucrose is:

powderized sucrose and tetrabutylammonium hydroxide were dried under 50° C. in vacuum oven overnight to remove water. 39.12 g sucrose was added into a 250 mL two-neck round bottom flask containing a Teflon-coated stir bar. Separately, 236.13 g methyl acrylate (three times in excess to sucrose), 1.38 g potassium carbonate, 2.75 g tetrabutylammonium hydroxide, 0.14 g hydroquinone and 0.14 g phenothiazine were pre-mixed in a beaker and added to the sucrose in the flask. The flask was connected to a condenser on one neck. A long needle was inserted into the flask through a rubber septum for dry air bubbling on the other neck. The reaction started by heating the flask in a silicone oil bath at 70° C. After designated reaction time, the reaction product mixture was diluted with acetone and the acrylated products were separated from the unreacted sucrose using vacuum filtration and acetone washing. The acrylated sucrose was recovered by removing acetone and excess methyl acrylate using rotary vacuum evaporation. About 25-30% sucrose was acrylated through this process, the unreacted sucrose and methyl acrylate can be re-used.

The IR spectra were recorded with Thermo Scientific Nicolet 8700 Fourier Transform Infrared Spectrometer with detector type DTGS KBr. The mass spectra were obtained with an Applied Biosciences 4000 Q-Trap MS-MS equipped with a turbospray ion source. A KD Scientific syringe pump (model 780100V) was used to infuse the sample to the Q-Trap at a rate of 0.6 mL/min. A small amount of diluted sample was drawn up into a delivery syringe and diluted ten times with a solution of 0.01% formic acid in methanol. A luer lock fitting with a length of PEEK tubing was attached to the syringe and this fed directly into the injection port of the Q-Trap. Dried, high purity nitrogen was the curtain gas and was introduced at 37 psi and regulated to 10 psi. The mass range of the Q-Trap instrument is m/z 50-2800 and subsets of this range were examined for mass detail. In some of the subset ranges, MCA mode was used to enhance detail. Scan type was Q1 MS and positive polarity. Ion spray voltage was 5500, declustering potential was 130, and entrance potential was 10. Scans were for 30 s with a step size of 0.1 amu, scan time of 0.8251 s, with 5 ms pause between mass ranges for a total scan time of 0.8301 s.

UV Curable Coating Formulation and Characterization

The liquid coating formulation was made by adding and mixing all the ingredients in a vial. Gentle heating was used to help dissolution of the ingredients when necessary. The liquid coatings were cast on aluminum Q-panels with a wire-wound drawdown rod to form a thin film with ~100 μm thickness, followed by UV curing using a Fusion LC6B Benchtop Conveyor with an F300 UVA lamp (UVA, intensity ~1180 mW/cm2 measured by UV Power Puck® II from EIT Inc.) in air. Typical curing protocol is 1 pass through the lamp with conveyor belt speed 10 inch/min. The coatings were tested after being conditioned in ambient laboratory conditions for at least 24 h. An automated surface energy measurement unit manufactured by Symyx Discovery Tools, Inc. and First Ten Angstroms was used to measure water contact angle on UV cured thin film materials. Droplets of water were deposited on the film surface and a CCD camera imaged the droplets; then automated image analysis was used to determine the contact angle. Three drops of water were used for each measurement, and the average contact angle values were reported. The standard deviation of water contact angle measurements is ca. ±2°.

Hardness testing was performed with a BYK Gardener pendulum hardness tester in König mode; the hardness was reported in seconds. Methyl ethyl ketone (MEK) double rubs were used to assess the solvent resistance of the cured coatings. A 26 oz hammer with 5 layers of cheesecloth wrapped around the hammerhead was soaked in MEK for rubbing. After 100 double rubs, the cloth was rewet with MEK. The number of double rubs taken to expose the substrate were recorded and reported. Falling weight direct impact testing was carried out according to ASTM D2794 with a 2 lb weight. The starting height was increased until the film was damaged and/or delaminated from the substrate, the maximum height at which the film was intact was recorded. The results were reported in inch-lbs. Tensile tests were performed using an Instron 5542 testing system (Instron Corp., Norwood, Mass.). ASTM D412-D dumbbell specimens were used. The strain rate was 0.2% s$^{-1}$.

Dynamic mechanical thermal analysis (DMTA) was performed using a TA Instruments Q800 DMA in rectangular tension/compression geometry. Free films were obtained by removing the cured coating from the aluminum substrate using a razor blade. Sample size was 10 mm×5 mm and film thickness was measured using a Micromaster® micrometer. The analysis was carried out from −50° C. to 200° C. at a frequency of 1 Hz and a ramp rate of 3° C. min$^{-1}$. $T_g$ was obtained from the maximum peak in the tan δ curves. Crosslink density ($v_e$) was calculated according to equation: $E'=3 v_e RT$, where E' value was determined in the linear portion at least 50° C. greater than the $T_g$. DSC experiments were performed utilizing a TA Instruments Q1000 DSC with a heat-cool-heat cycle. The sample size ranged from 4.5 to 5.5 mg. Temperature was ramped from −50° C. to 200° C. at 10° C. min$^{-1}$ in nitrogen.

Results and Discussion

Synthesis and Characterization of Acrylated Sucrose and Methacrylated Sucrose

Figure 10:
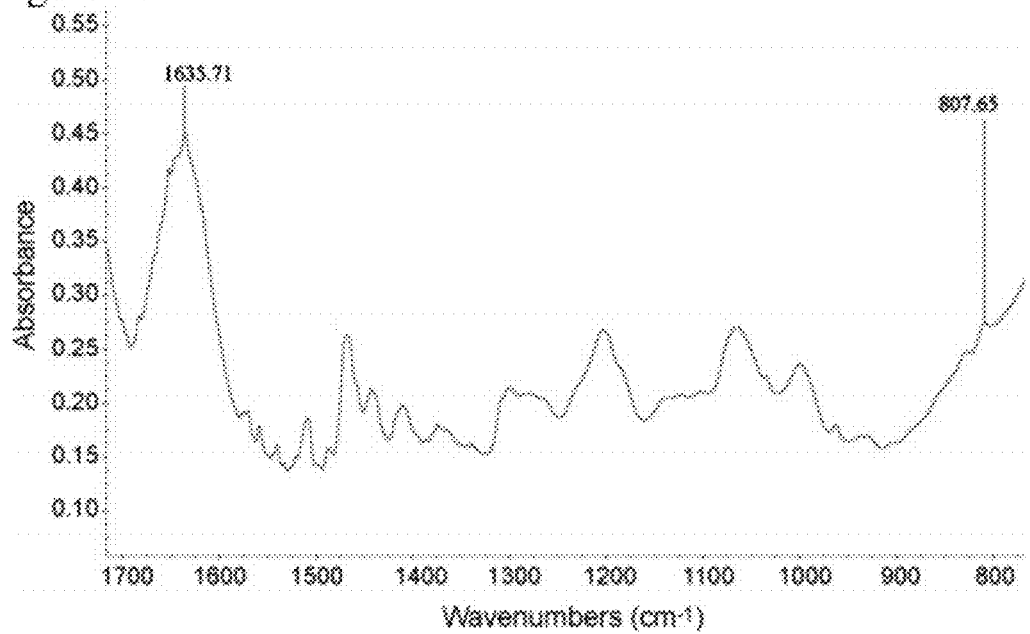
FIG. 10 shows a FTIR spectrum of acrylated sucrose obtained after 6 h reaction (AS6h), showing the appearance of acrylate peaks at 1635 and 807 $cm^{-1}$.
Figure 11A:
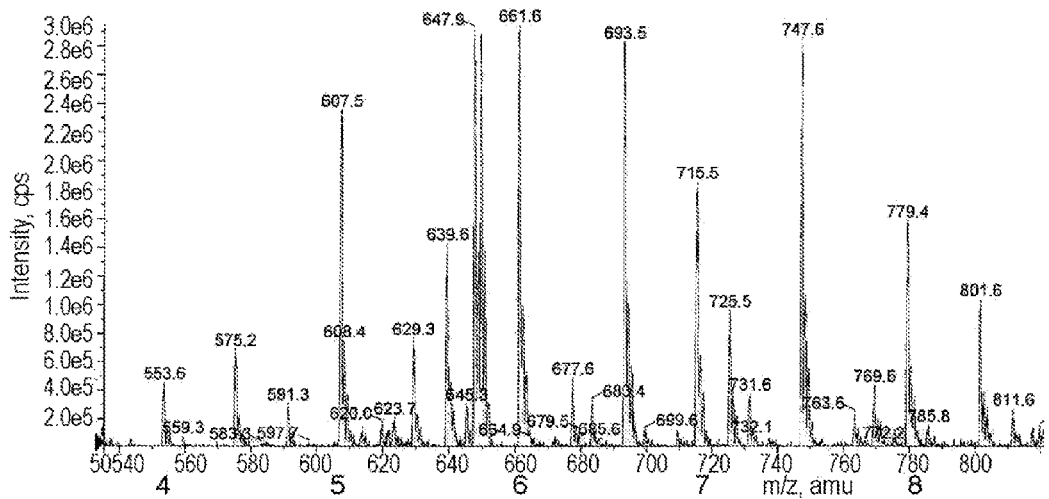
FIG. 11A shows a mass spectrum of AS6h.
Figure 11B:
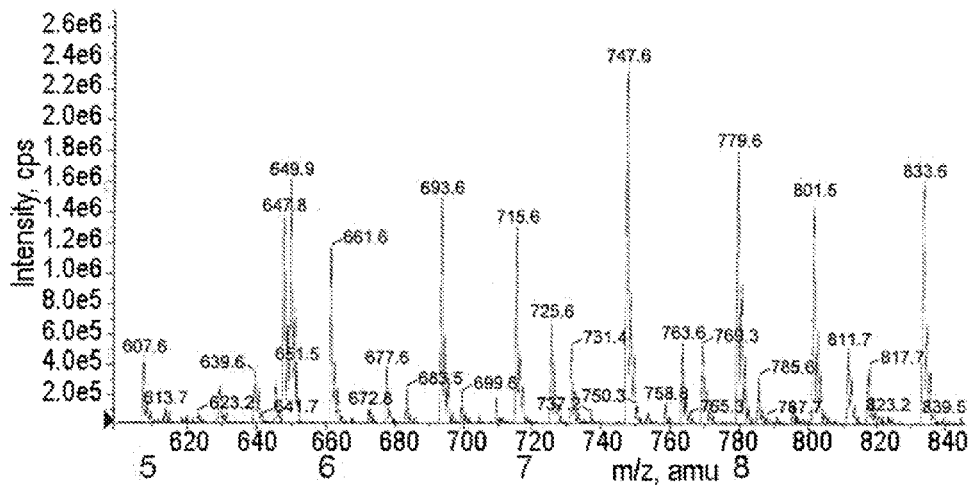
FIG. 11B shows a mass spectrum of AS12h.
Figure 12:
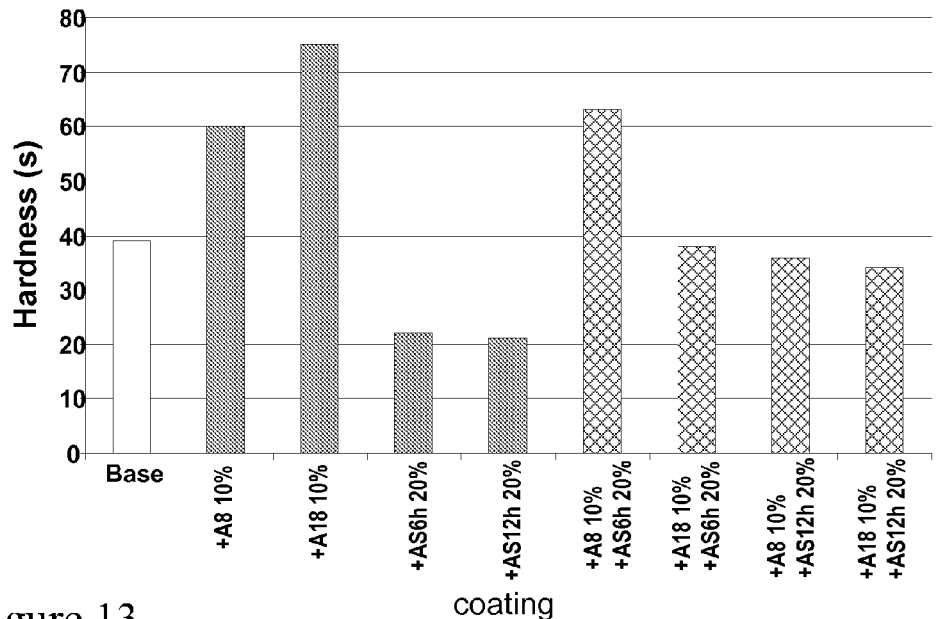
FIG. 12 shows a comparison of coating pendulum hardness.
Figure 13:
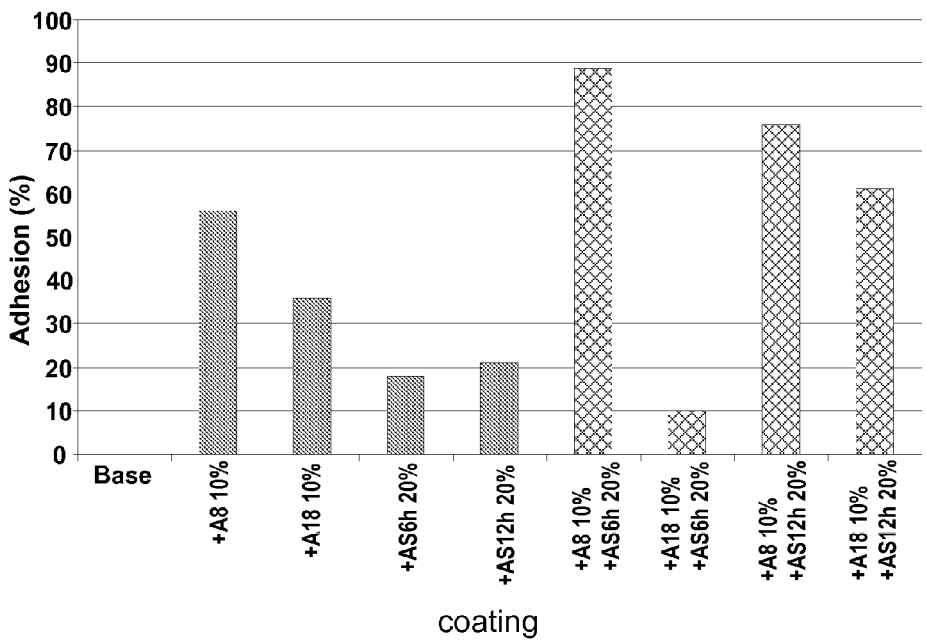
FIG. 13 shows a comparison of coating adhesion to aluminum.
Figure 14:
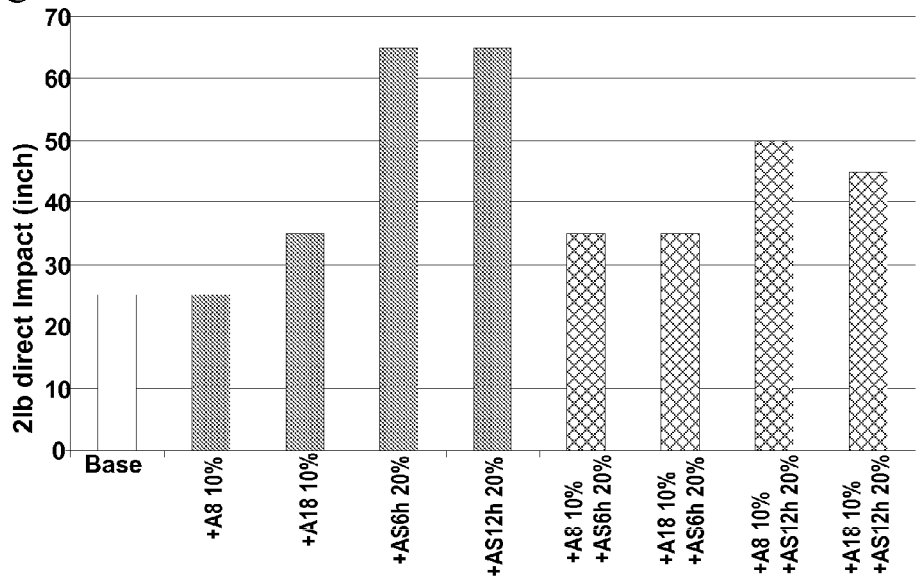
FIG. 14 shows a comparison of coating impact resistance.
Figure 15:
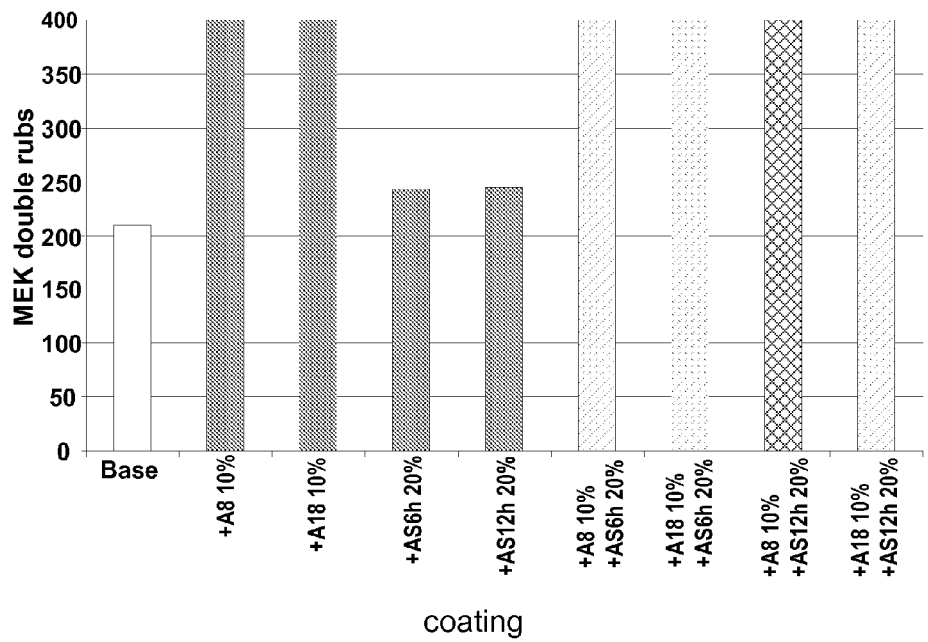
FIG. 15 shows a comparison of coating solvent resistance.

The synthesized acrylated and methacrylated sucrose (AS and MAS) are brown, highly viscous, syrup like materials. Unlike sucrose, which has poor solubility in most organic solvents, the AS and MAS exhibited good solubility in common organic solvents such as acetone, methanol, THF etc. as well as in water. In addition, the AS and MAS showed good solubility in the reactive diluent THFA. Generally, it was found that AS and MAS products obtained after longer reaction time had better solubility. IR and Mass Spectroscopy were used to characterized the obtained AS and MAS. The appearance of the characteristic acrylate peaks at 807 and 1635 cm$^{-1}$ in FTIR spectra indicates the attachment of acrylate group to the sucrose, as exemplified in FIG. 10. FIGS. 11A and B shows the mass spectra of AS obtained after 6 h and 12 h reactions (AS6h and AS12h) respectively, Table 5 lists the theoretical molecular weight calculation for acrylated sucrose with increasing acrylate functionalities. Molecular ion peaks with close molecular weight numbers shown in Table 5 were identified in the mass spectra for AS6h and AS12h, indicating the existence of AS with varying degree of acrylation in the product mixture. Also, it was noticed from FIGS. 11A and B that the acrylate functionality on the AS increased with increasing reaction time. In AS6h, five, six and seven acrylate functionalized sucrose monomers are predominant; in AS12h, seven and eight acrylate functionalized sucrose monomers are predominant. The Mass Spectroscopy results of AS6h and AS12h showed that the distribution and degree of acrylate functionality of the synthesized AS can be controlled by controlling the reaction time. Preliminary UV curing of synthesized AS and MAS were carried out. MAS exhibited poor photopolymerization reactivity, thus only AS were chosen for formulation study.

TABLE 5

Molecular weight calculation for acrylated sucrose monomers.

| Acrylate functionality | Theorectical MW of AS | +17 (HO−) | +23 (Na+, from the container glass, etc.) |
|---|---|---|---|
| 4 | 558.5 | 575.5 | 581.5 |
| 5 | 612.5 | 629.5 | 635.5 |
| 6 | 666.5 | 683.5 | 689.5 |
| 7 | 720.6 | 737.6 | 743.6 |
| 8 | 774.6 | 791.6 | 797.6 |

Formulation and Characterization of Soy-Based UV Curable Coatings Containing Acrylated Sucrose and Hyperbranched Acrylates The commercial ASBO is a highly viscous liquid. It can be UV cured in seconds by adding 3 wt.-% PI, but the formulation viscosity is too high for coatings applications. 20 wt.-% THFA was added to the ASBO and PI blend to achieve a reference formulation (base) with suitable viscosity. To study the effect of AS and hyperbranched acrylates (HBAs) on the soy-based UV curable formulations, AS6h and AS12h, and A8 and A18 were added into the Base, together with 5 wt.-% 1:1 blend of Ebecryl® 168 and 170 to enhance the adhesion to aluminum panel. The coating material performance of these formulations were tested and compared.

The coating physical properties were tested. FIGS. 12-15 show and compare the coating pendulum hardness, crosshatch adhesion, impact resistance and solvent resistance respectively. Compared to the base formulation, the addition of only 10 wt.-% HBAs significantly increased the coating hardness and solvent resistance. This enhancement is attributed to the incorporation of higher molecular weight multifunctional crosslinkers (HBAs) with higher glass transition temperatures and more rigid polyester backbones in the crosslinked ASBO based coating films. The base formulation has very poor adhesion on aluminum. Upon addition of HBAs and adhesion promoter, the coatings adhesion was improved. The lower photopolymerization shrinkage of HBAs (Shi et al., 2001 Trends Photochem. Photobiol. 7:131), the acidic etching of the metal substrate by the adhesion promoters, and the phosphonate complex formation between the metal and the adhesion promoters (Chougrani et al., 2008 J. Polym. Sci.: Part A: Polym. Chem. 46:7972) were attributed to the much improved adhesion. The addition of A8 did not affect the coating impact resistance. On the other hand, A18 addition increased the impact resistance from 25 inch to 35 inch. The coating impact resistance is an overall evaluation of the coating adhesion, flexibility and toughness. The addition of more rigid A8 and A18 enhanced the coating adhesion as a result of lower photopolymerization shrinkage. However, the film flexibility did not seem to increase accordingly. Thus, only slight increase of coating impact resistance was observed.

In contrast to HBAs, the incorporation of 20 wt.-% AS6h and AS12h into the base formulation generated tougher coating films, as evidenced by the much enhanced coating impact resistance. At the same time, the decreased coating hardness and similar solvent resistance was found for the AS added formulations as compared to the base formulation. These observations suggested that the AS6h and AS12h are acting as reactive flexibilizers in the soy-based coating formulations. Unmodified sucrose molecules have intensive intermolecular hydrogen bonding which results in a hard, crystalline material (Mathlouthi and Reiser, 1994 *Sucrose: Properties and Applications*, Blackie Academic and Professional, Glasgow). Upon acrylation, as in the case of AS6h and AS12h, most of the hydroxyls in the sucrose were transformed into photo reactive acrylate groups. Thus hydrogen bonding interaction in the AS is expected to be less intense. On the other hand, the five and six member aliphatic rings linked by an ether bond in the sucrose molecule possess balanced rigidity and flexibility. Most probably, crosslinked network containing such molecules would exhibit larger deformation before breaking under external force by dissociation of the hydrogen bonding and transformation of the acrylated sucrose molecule configuration. Consequently, lower pendulum hardness but tougher coating films with much higher impact resistance were obtained when the AS were added. Negligible adhesion enhancement was found for the AS added samples. It is most probably due to the lower molecular weight of the AS molecules as compared to the HBAs, thus the photopolymerization induced shrinkage is still significantly high enough to adversely affect the adhesion (Shi et al., 2001 Trends Photochem. Photobiol. 7:131).

The combination of 10 wt.-% HBAs and 20 wt.-% AS6h or AS12h into the ASBO-based formulations generated balanced coating performance. The coating hardness and impact resistance were in between the properties obtained by adding either the HBA or AS individually. However, it was noticed that the coating solvent resistance was not sacrificed and remained over 400 double rubs even upon the addition of 20 wt.-% AS. Also, the coating adhesion for formulations containing both HBAs and AS was higher than the formulations with individual addition of either HBAs or AS, except for the formulation with 10% A18 and 20% AS12h. A synergistic effect between the HBAs and the AS seems to exist. The reactive nature of the AS helps to maintain the excellent solvent resistance obtained by addition of HBAs. The relatively flexible AS may contribute to stress dissipation inside the coating film during photopolymerization, leading to enhanced adhesion. This synergistic effect will be further discussed when examining the thermal mechanical behavior of the coatings in the article.

Figure 16:
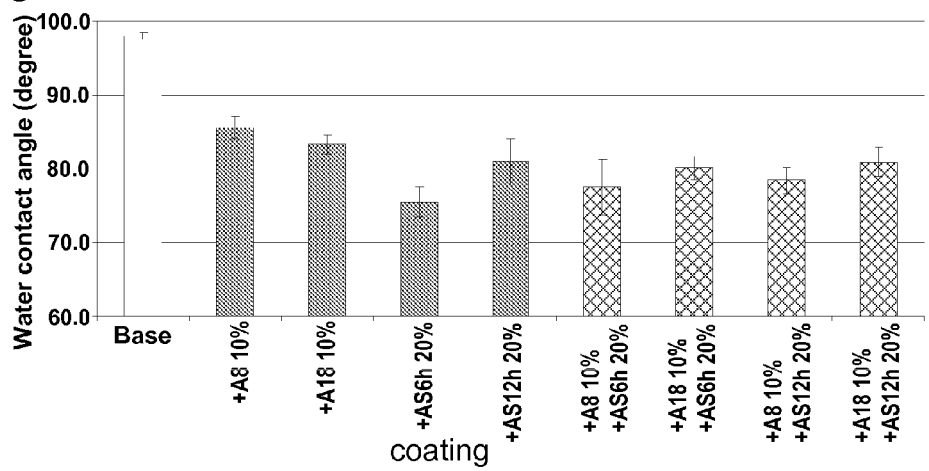
FIG. 16 shows water contact angle data for UV cured, soy-based coatings.

The synthesized AS6h and AS12h had good solubility in water. The effect of their hydrophilicity on the coating surface and bulk properties were evaluated by water contact angle measurements and water immersion test. FIG. 16 shows that the coating produced from the base formulation, which has over 75 wt.-% ASBO, is hydrophobic with contact angle over 95 degree due to the hydrophobic nature of the vegetable oil based crosslinked network. Upon addition of HBAs, the coating contact angle decreased to around 85°, as a result of diluting the hydrophobic ASBO network with relatively more hydrophilic polyester HBAs. When 20 wt.-% hydrophilic AS6h or AS12h was added respectively into the base formulation, further decrement of the water contact angle was noticed, especially for the formulations containing AS6h, which is more hydrophilic due to the existence of higher number of residual hydroxyls in the acrylated sucrose molecule. The combination of both HBAs and AS with ASBO produced relatively hydrophilic coatings with water contact angles around 80°.

Figure 17:
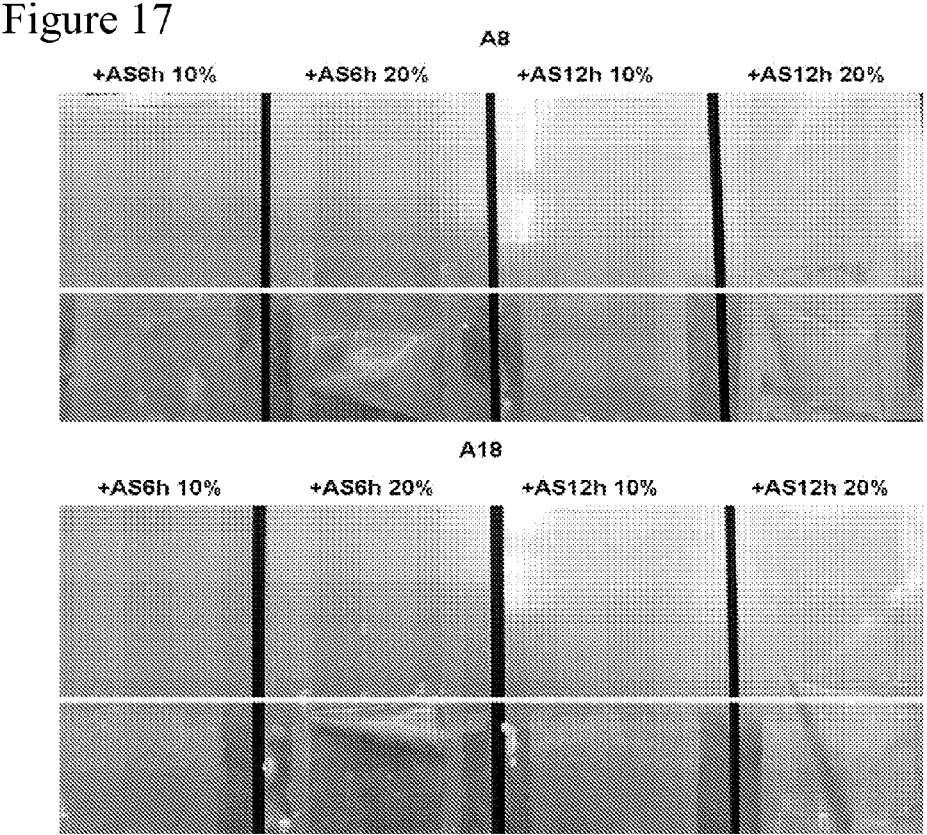
FIG. 17 shows coating film images after 7 days tap water immersion, the white line in the images shows the approximate location of water line during immersion.

Tap water immersion test was conducted to examine the stability of AS added, ASBO based coating films in water. 10 or 20 wt.-% AS6h and AS12h were added to the base formulation together with 10 wt.-% of A8 or A18. The formulations were applied onto bare aluminum panels, UV cured, and immersed in water for up to 7 days. Visual examinations of the coating films were conducted to evaluate the coating film stability in water. FIG. 17 shows the images of the coating films taken after 7 days water immersion. For the coatings containing 20 wt.-% either AS6h or AS12h, the films delaminated from the bare aluminum panels after about 24 h immersion. The stress generated from coating film swelling upon water absorption, and the reduced adhesion at the coating-substrate interface due to the replacement of water (Grundmeier and Stratmann, 2005 Annu Rev. Mater. Res. 35:571) were considered the major reasons for the quick delamination from the bare aluminum substrate. This observation confirms the high hydrophilicity of the coatings with high AS loading (20 wt.-%). With 10 wt.-% AS6h and AS12h addition, the ASBO based coating films showed rather good stability in water after 7 days, as shown in FIG. 17. Except for the formulation containing 10 wt.-% AS6h and 10 wt.-% A8, which showed slightly delamination after 7 days, all the other coating films adhered well to the bare aluminum panel. Most part of the immersed films remained smooth despite that certain spots of the films turned from clear to haziness due to water absorption. Formulations containing AS6h had relatively lower resistance to water immersion than the ones containing AS12h, which can be attributed to the higher hydroxyl content in AS6h.

Figure 18A:
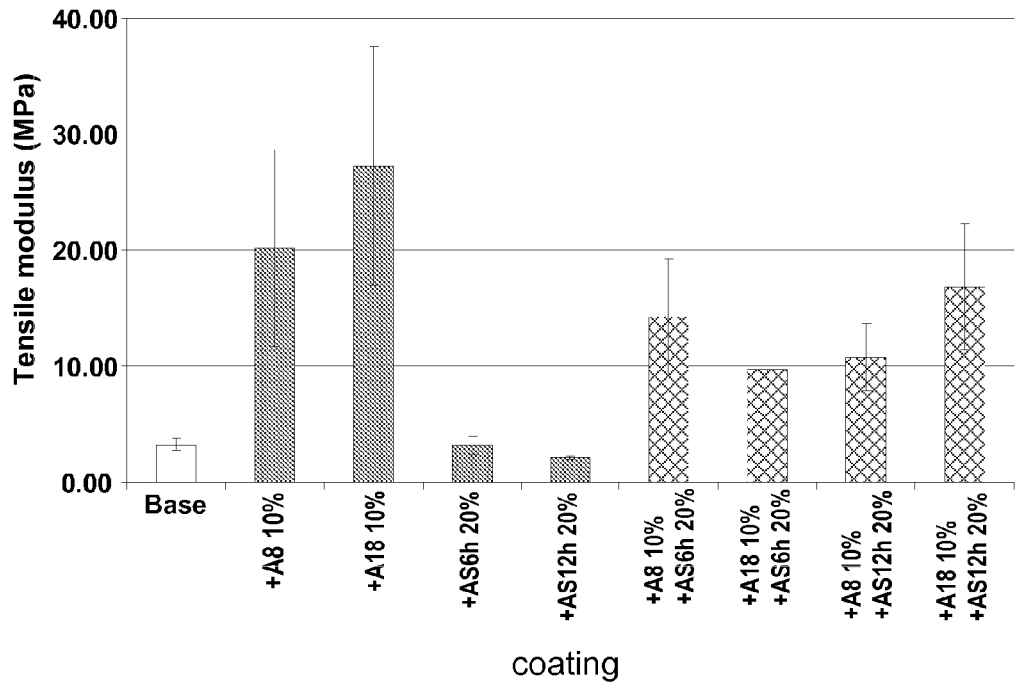
FIG. 18A shows tensile modulus for UV cured, soy-based coatings.
Figure 18B:
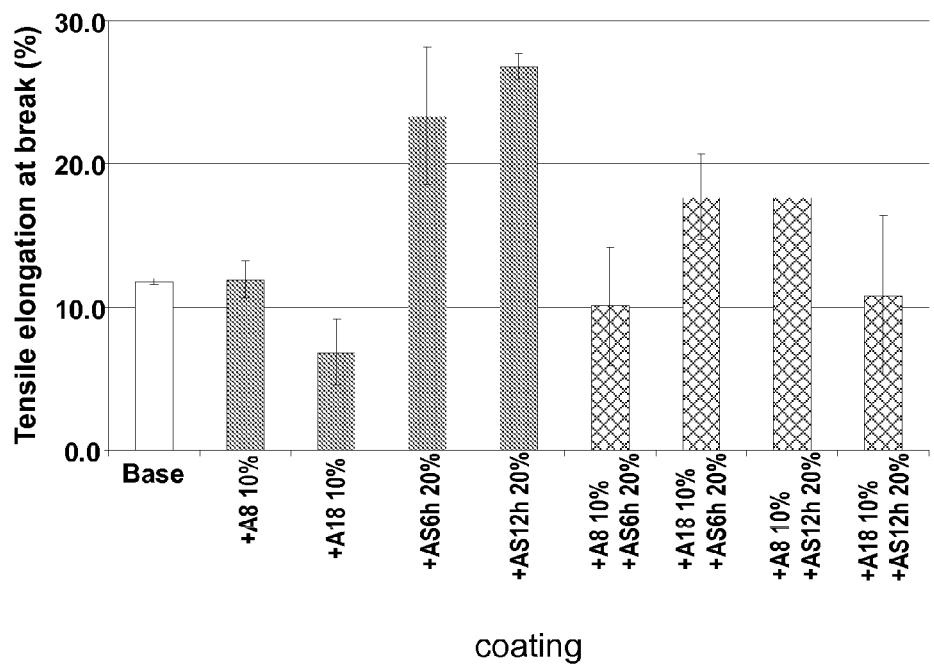
FIG. 18 B shows tensile elongation for UV cured, soy-based coatings.

The tensile modulus and elongation at break of the UV cured, soy-based coating films were obtained and the results shown in FIGS. 18A and B. Compared to the base formulation, significant coating modulus increment was achieved upon addition of HBAs, especially A18, which has higher acrylate functionality and glass transition temperature than A8. The rigidity of the coating film increased accordingly as indicated by the lower elongation at break with A18 addition. When AS6h or AS12h was added to the base formulation, the film modulus did not change significantly, but the elongation at break increased by over 100%. The much enhanced elongation at break value is consistent with the observed much higher impact resistance after addition of AS to the base formulation, demonstrating the significant toughening effect of the AS in the UV cured soy-based coatings. A "mixing" effect was noticed for the formulations containing both AS and HBAs, as their modulus and elongation at break data were between the ones with only AS or HBA, showing balanced coating mechanical properties.

Figure 19A:
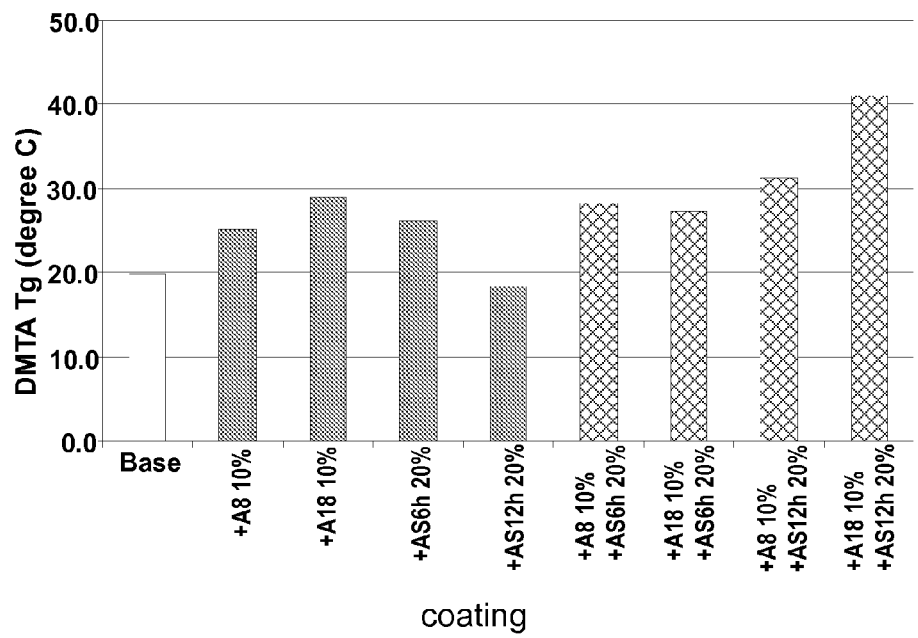
FIG. 19A shows DMTA glass transition (main) for UV cured soy-based coatings.
Figure 20:
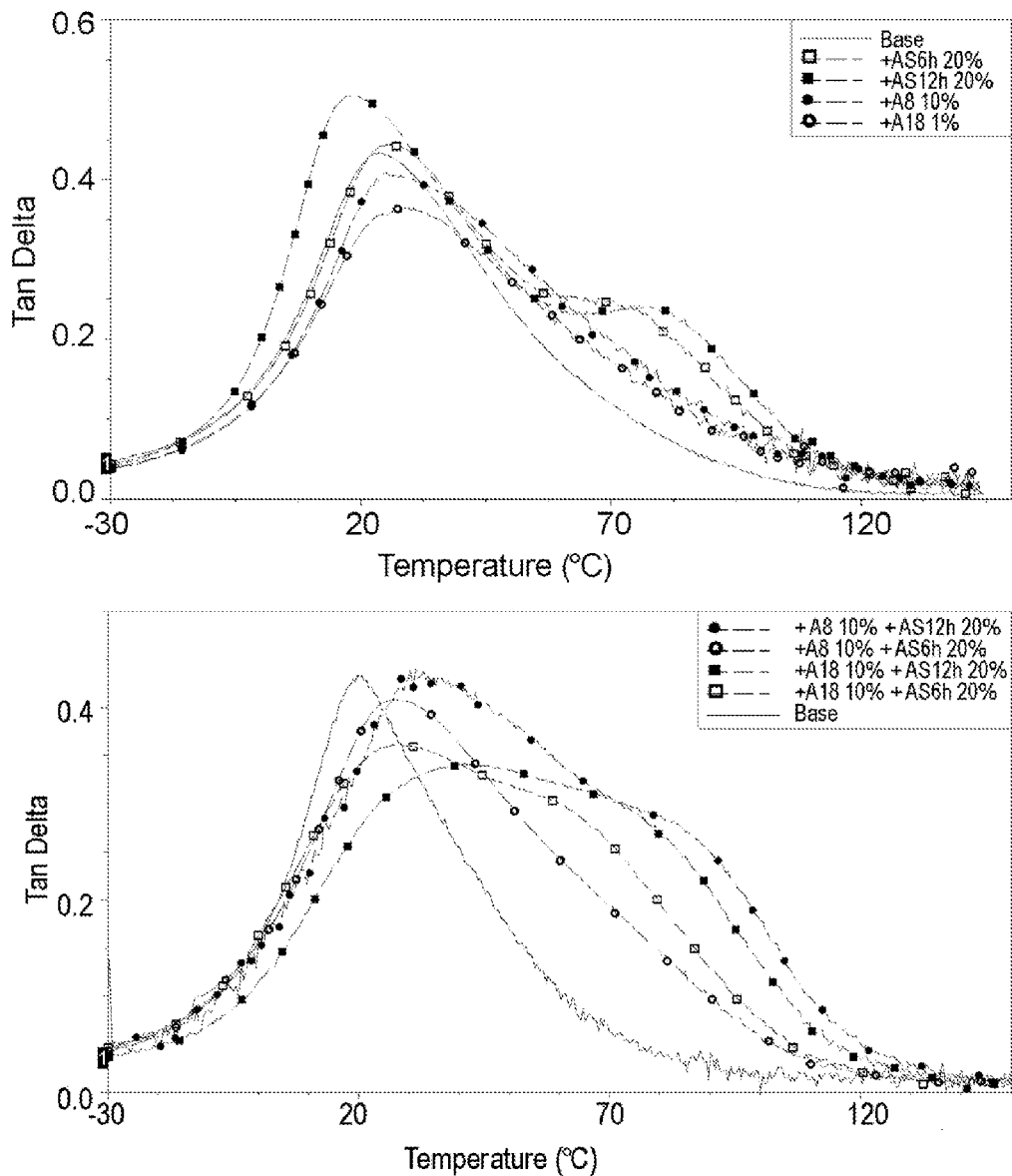
FIG. 20 shows overlap of DMTA tan δ curves for UV cured, soy-based coatings.

The glass transition temperature and crosslink density of the soy-based coatings were obtained and calculated from DMTA as shown in FIGS. 19A and B, the overlap of the DMTA tan δ curves is shown in FIGS. 20A and B. The glass transition temperature of the base formulation is around 20° C., as a result of the softer, more flexible fatty acid triglyceride backbone of ASBO. The polyester HBAs A8 and A18 have much higher glass transition temperatures than ASBO due to the more rigid polyester backbone, higher molecular weight, and higher acrylate functionality. Upon individual A8 and A18 addition, the main glass transition temperature of the coatings increased to 25-30° C. Also, the glass transition peak broadened and extended to higher temperatures. The higher and broader glass transition in the two HBA added UV cured coating formulations contributed to the higher hardness and modulus of the coatings films, indicating tougher crosslinked network formation. However, the crosslinking density for the two HBA added formulations (+A8 10% and +A18 10%) were lower than the base formulation.

Figure 19B:
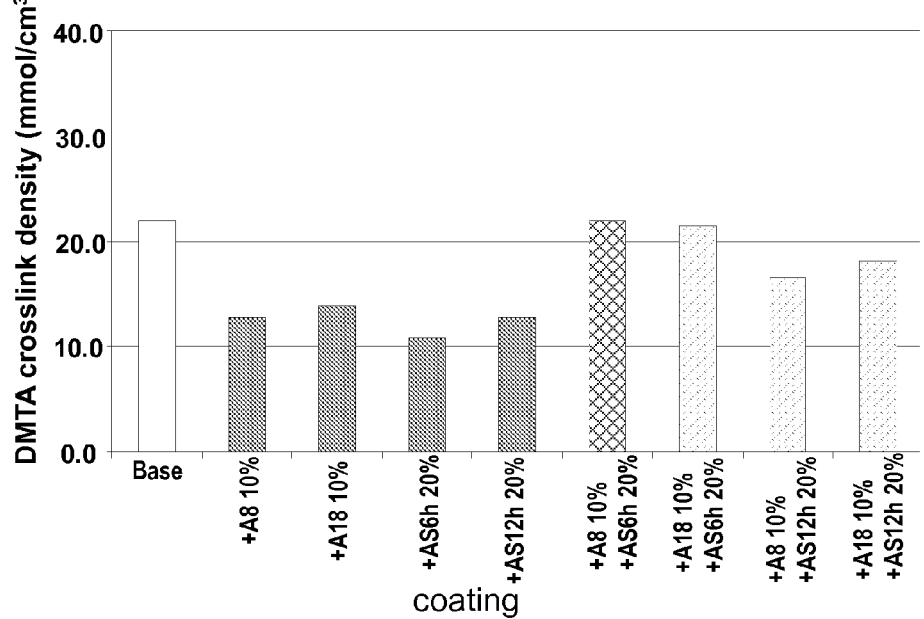
FIG. 19 B shows DMTA crosslink density for UV cured soy-based coatings.

The earlier photopolymerization induced vitrification of the higher functionality and higher molecular weight HBAs added formulations are considered the reasons for lower crosslink density (Shi et al., 2001 Trends Photochem. Photobiol. 7:131; Chen and Webster, 2006 Polymer 47:3715). When only 20 wt.-% AS6h or AS12h was added to the base formulation, it was noticed from FIGS. 19 and 20 that the main glass transition of the crosslink network for these two samples did not change significantly from the base formulation. However, an apparent second transition appears as a shoulder peak at higher temperature (about 80° C.). The second transition was attributed to the acrylated sucrose in the soy-based crosslinked coating network. The two transition peaks in the tan δ curves indicates that there are two microphases (Lee et al., 1996 J. Polym. Res. 3:159; Zheng et al., 2006 Polymer 47:7786) in the crosslinked, acrylated sucrose added UV cured coating films. The predominant phase is the crosslinked ASBO, the second phase is the crosslinked acrylated sucrose monomers. Due to the more rigid AS ring structure and intermolecular hydrogen bonding, the second phase has higher transition temperature. Since the second transition appears as a shoulder peak of the main transition peak in the tan δ curves, it can be concluded that there is certain degree of compatibility or "phase mixing" between the ASBO and AS phases (Chattopadhyay et al., 2005 Ind. Eng. Chem. Res. 44:1772), largely owing to the chemical bonding formed between ASBO and AS during the photopolymerization of the acrylate groups. The presence of two interconnected soft and hard micro phases resembles the micro phase separation in a typical polyurethane polymer, which exhibits excellent mechanical properties (Chattopadhyay et al., 2005 Ind. Eng. Chem. Res. 44:1772; Miller et al., 1985 Macromolecules 18:32). The existence of micro phase separation in the AS added, ASBO based crosslinked network provides a microscopic level explanation for the observed significantly enhanced coating film impact resistance and tensile elongation at break.

When both HBAs and AS were added into the ASBO based formulation, it was first noticed from the tan δ curves that the main transition peaks still appear at higher temperatures and are broader than the base formulation, but the higher temperature transition peaks assigned to the AS phase were less distinct, indicating better compatibility between the ASBO and AS. Hyperbranched polymers, owing to their hyperbranched molecular structure, have higher solubility and compatibility with other chemicals (Sharma and Kundu, 2007 Biomacromolecules 8:2476; Pettersson, 1996 Pigm. Resin Technol. 25:4). Thus, the indistinct higher transition temperature peak is most probably due to the compatibilizer role the HBAs played in the ASBO and AS added formulations. Despite improved compatibility after HBAs addition to the ASBO and AS containing formulations, the less distinctive microphase separation, and the incorporation of more rigid, higher glass transition temperature HBAs generated coating films with lower impact resistance than the ones with only AS addition. With regard to other coating film properties such as tensile modulus and elongation, hardness, and impact resistance etc., a "mixing effect" produced balanced coating properties. Higher crosslink density was found for both HBAs and AS added formulations as compared to formulations containing only HBAs or AS. This may be due to the apparent higher rubbery modulus obtained in the DMTA experiments, since higher photopolymerization conversion of the acrylate functional groups on HBAs and AS is less possible due to early vitrification in the formulations with higher acrylate functionality, higher viscosity, and lower mobility (Shi et al., 2001 Trends Photochem. Photobiol. 7:131; Chen and Webster, 2006 Polymer 47:3715).

Figure 21:
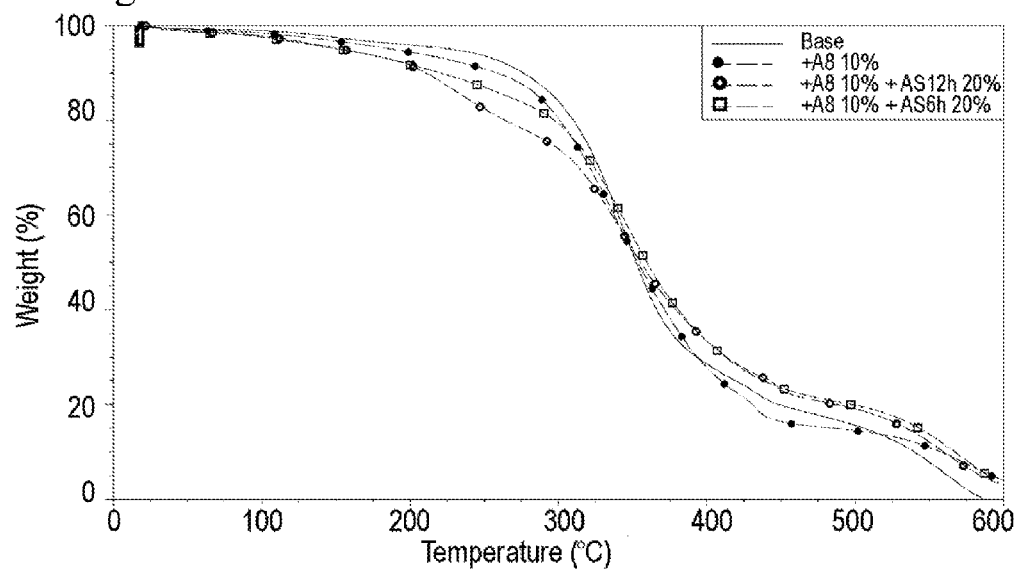
FIG. 21 shows TGA weight loss curves of UV cured soy-based coatings.
Figure 21:
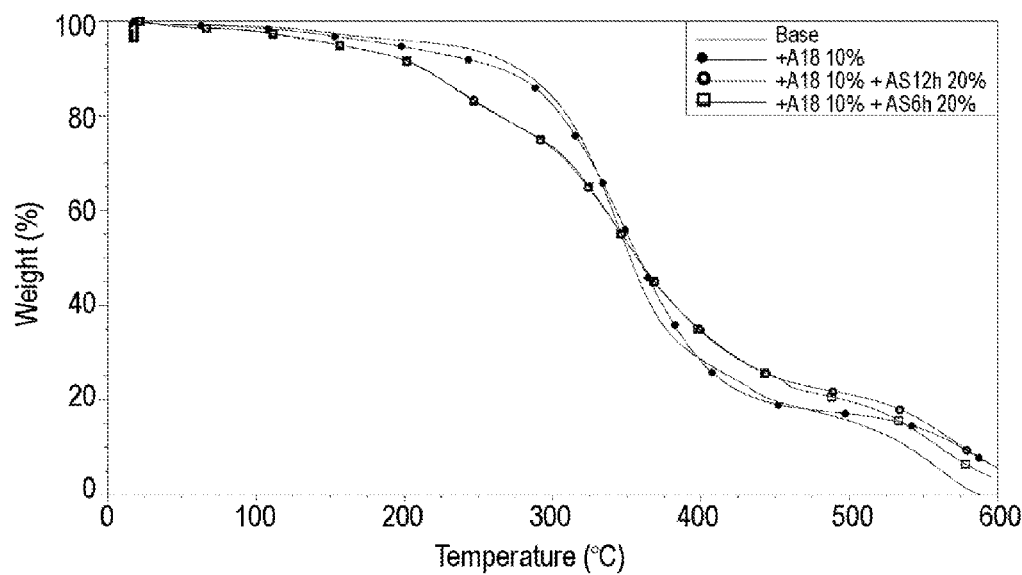

Thermal stability of the soy-based UV curable coatings was studied using Thermal Gravimetric Analyzer (TGA). The percent weight loss of the samples was plotted as a function of temperature as shown in FIGS. 21A and B. All the samples tested showed a two step weight loss profile. The base formulation showed major thermal decomposition between 250 and 400° C., after which the sample continued to lose weight but at a slower rate, until at around 590° C. all the residual material burned off. When 10 wt.-% HBAs were added to base formulation, the weight loss profiles showed a similar major decomposition temperature range to the base formulation, but at a little faster rate. After the major decomposition, the HBAs added formulations exhibited slower decomposition rate than the base formulation, with more (about 5 wt.-%) material left at the end of the TGA run. With 20 wt.-% AS (AS6h or AS12h) and 10 wt.-% HBAs (A8 or A18) added to the base formulation, it was noticed that the major decomposition event for these samples started at lower temperature around 200° C., and before 350° C. the decomposition rate was much faster than other formulations without AS. This is due to the presence of sucrose in crosslinked networks, which starts thermal decomposition at ~186° C. and shows major weight loss at maximum rate at 233-300° C. (Richard and ShaJzadeh, 1978 Aust. J. Chem. 31:1825). There is a crossover point around 350° C. in the weight loss curves for AS added formulations with other formulations without AS. After which, the AS added formulations decomposed at a slower rate. Solid char formation as a result of the degradation of the sucrose components in the films may be the reason for the slower weight loss rate observed (Richard and ShaJzadeh, 1978 Aust. J. Chem. 31:1825).

Figure 22:
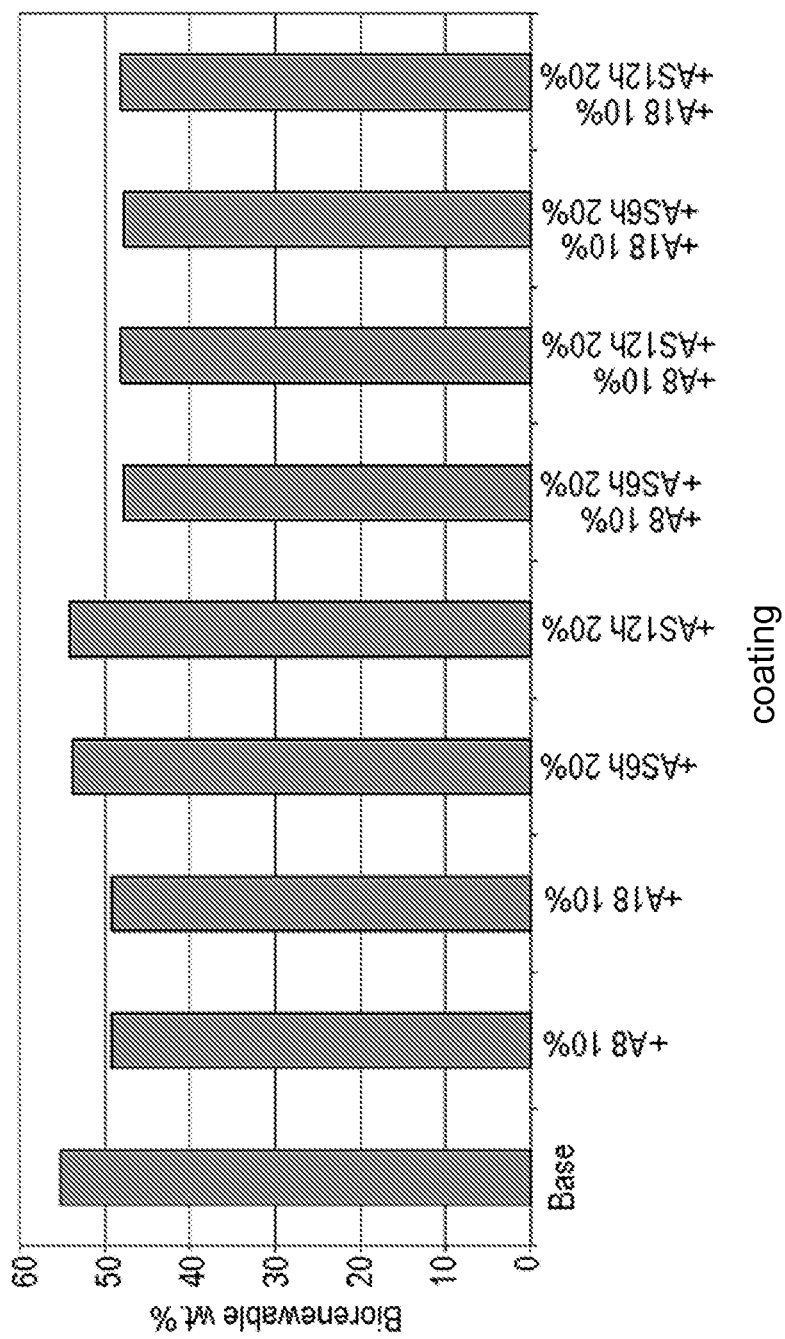
FIG. 22 shows biorenewable content in wt.-% for the formulations studied.

The biorenewable content in weight percentage for the raw materials and the soy-based, UV curable coating formulations studied was calculated (acrylic acid was not counted as a bio-derived chemical in the calculations) and shown in Table 6 and FIG. 22 respectively. When combining the HBAs and AS as reactive toughening agents into the base formulation, the biorenewable content of the modified formulations decreased by ~10-15 to about 50 wt.-%, which is still reasonably high. On the other hand, the corresponding coating performance increased significantly, owing to the unique structural features of the HBAs and the AS discussed previously. The feasibility of producing soy-based, high performance UV curable coatings with high biorenewable content is demonstrated.

TABLE 6

Biorenewable content in weight percentage for raw materials used in coating formulations.

| Raw materials | ASBO | HBA | THFA | PI | AP | AS6h | AS12h |
|---|---|---|---|---|---|---|---|
| Biorenewable content, wt-% | 60[a] | 0 | 60 | 0 | 0 | 53 | 55 |

[a]"Energy Curable Renewable Raw Material Energy Curable Renewable Raw Material," 2009 available on the World Wide Web at cytec.com/uv/Downloads/Cytec_RRM_Rad-cure.pdf.

Conclusion

Acrylated sucrose (AS) monomers were synthesized and characterized using mass spectroscopy and FTIR. AS monomers had good solubility in common organic solvents and reactive diluent THFA. The acrylation degree of AS increased with increasing reaction time. Addition of higher $T_g$, polyester HBAs into the ASBO-based, UV curable formulations increased the coating mechanical properties as well as glass transition temperature and tensile modulus, but decreased the crosslink density and tensile elongation. Addition of the AS significantly enhanced the coating impact resistance and tensile elongation, which is attributed to the micro phase separation in the crosslinked coating films and the tougher molecular structure of AS. Excess AS in the formulations resulted in high coating hydrophilicity and consequent film delamination during water immersion. The combination of HBAs and AS in the ASBO-based UV curable formulations produced "green" coatings with much enhanced and balanced properties and ~50 wt.-% biorenewable content.

EXAMPLE 3

USB Panels UV Cured and Salt Sprayed

Bare aluminum panels were cleaned with acetone and, as described in Example 2, the coating formulations were applied and cured to the bare aluminum. An optimized Base having the following formulation was used: commercial acrylated soybean oil (ASBO), 3% free radical photoinitiator, 20% THF acrylate, 5% adhesion promoter, +10% HBAs (A8 or A18 polyester hyperbranched acrylate), +20% AS6h or AS12h, and ~55-65% biorenewable content.

Figure 23A:
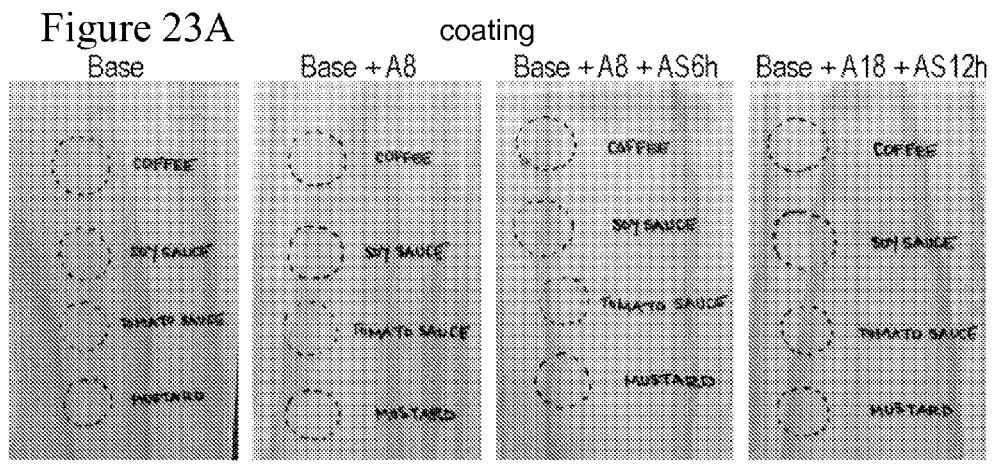
FIG. 23A shows stain resistance to salt spray for UV cured soy-based coatings.

Stain resistance testing was performed using common household agents (coffee, soy sauce, tomato sauce, and mustard). A sponge wetted with a solution of the household staining agent was applied to the panel and covered with a cap. The sponge was re-wetted with the stain solution each day. After 7 days, the sponge was removed and the panel was cleaned with deionized water. Images of stain resistance are shown in FIG. 23A.

Figure 23B:
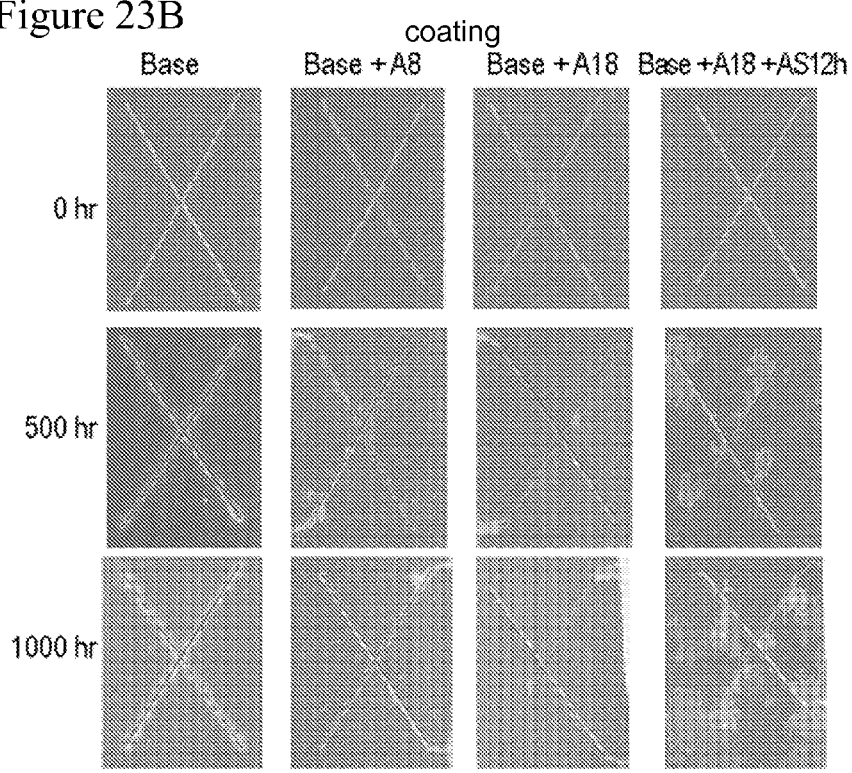
FIG. 23B shows corrosion resistance to salt spray for UV cured soy-based coatings.

Durability testing was performed to determine corrosion resistance. A salt fog spray was applied and images of the aluminum panels at 0 h, 500 h, and 1000 h are shown in FIG. 23B. Hydrophobicity and good adhesion correlate with better corrosion performance.

Corrosion resistance after exposure to salt spray of the Base alone, the Base plus 10% A8, and of the Base plus 10% A18 was observed. After 1000 hours, the Base formulation has better corrosion protection than the other two modified formulations, probably due to the added 5% adhesion promoters. Addition of HBA acrylates (A8 and A18) in this batch did not improve corrosion resistance.

Table 7 shows observations for 1500 hours exposure to salt spray.

TABLE 7

| | Observations at 1500 hours | | |
|---|---|---|---|
| coating formulation: | Base | | |
| panel: | 1 | 2 | 3 |
| corrosion resistance: | good | good | good; except for blistering at 4 places |
| coating formulation: | Base + A8 | | |
| panel: | 1 | 2 | 3 |
| corrosion resistance: | corrosion around X | good | good |
| coating formulation: | Base + A18 | | |
| panel: | 1 | 2 | 3 |
| corrosion resistance: | corrosion around X | corrosion around X | corrosion around X |

Table 8 shows observations for 2000 hours of exposure to salt spray.

TABLE 8

| | Observations at 2000 hours | | |
|---|---|---|---|
| coating formulation: | Base | | |
| panel: | 1 | 2 | 3 |
| corrosion resistance: | good | slight corrosion around X | good |
| coating formulation: | Base + A8 | | |
| panel: | 1 | 2 | 3 |
| corrosion resistance: | corrosion around X | corrosion around X | corrosion around X |
| coating formulation: | Base + A18 | | |
| panel: | 1 | 2 | 3 |
| corrosion resistance: | corrosion around X | corrosion around X | corrosion around X |

The complete disclosures of all patents, patent applications including provisional patent applications, and publications, and electronically available material cited herein are incorporated by reference.

The foregoing description and examples have been provided for illustration and clarity of understanding only. It is to be understood that the particular examples, materials, amounts, and procedures are to be interpreted broadly in accordance with the scope and spirit of the invention as set forth herein. No unnecessary limitations are to be understood therefrom. The invention is not limited to the exact details shown and described; many variations will be apparent to one skilled in the art and are intended to be included within the invention defined by the claims.

What is claimed is:

1. A curable composition comprising:
    an acrylated plant oil present in an amount of at least 40% of the composition, by weight;
    a hyperbranched polyester acrylate present in an amount of 10 to 40% of the composition, by weight; and
    a biorenewable reactive diluent comprising tetrahydrofurfuryl acrylate;
    wherein the composition has a biorenewable content of at least 55% by weight.

2. The composition of claim 1 wherein the acrylated plant oil comprises acrylated epoxidized soybean oil.

3. The composition of claim 1 wherein the reactive diluent is present in an amount up to about 50% of the composition, by weight.

4. The composition of claim 1 further comprising a photoinitiator.

5. The composition of claim 4 wherein the photoinitiator is present in an amount up to about 10% of the composition, by weight.

6. The composition of claim 1 further comprising an adhesion promoter.

7. The composition of claim 6 wherein the adhesion promoter is present in an amount up to about 10% of the composition, by weight.

8. The composition of claim 1 comprising:
    a photoinitiator in an amount of 0 to 10% of the composition, by weight; and
    the biorenewable reactive diluent in an amount up to 50% of the composition, by weight; and
    the hyperbranched polyester acrylate in an amount of 10 to 40% of the composition, by weight; and
    an adhesion promoter in an amount of 0 to 10% of the composition, by weight; and
    and acrylated plant oil to 100% of the composition, by weight.

9. A coating, film, adhesive or ink comprising the composition of any of the previous claims.

10. The coating, film, adhesive or ink of claim 9 which is UV-cured.

11. The coating, film, adhesive or ink of claim 9 which is thermally cured.

12. An article or surface comprising the coating, film, adhesive or ink of claim 9.

* * * * *